United States Patent [19]

Sunamori et al.

[11] 4,051,004
[45] Sept. 27, 1977

[54] ELECTRODEPOSITION COATING METHOD USING ALTERNATING CURRENT

[75] Inventors: Takashi Sunamori; Sachio Obana, both of Ohtake, Japan

[73] Assignee: Mitsubishi Rayon Co., Ltd., Tokyo, Japan

[21] Appl. No.: 588,654

[22] Filed: June 19, 1975

[30] Foreign Application Priority Data

June 26, 1974 Japan .................................. 49-73582
July 1, 1974 Japan .................................. 49-75628
July 24, 1974 Japan .................................. 49-84112
July 24, 1974 Japan .................................. 49-84113
July 24, 1974 Japan .................................. 49-84114
Aug. 1, 1974 Japan .................................. 49-88413

[51] Int. Cl.² .................................. C25D 13/18
[52] U.S. Cl. .................. 204/181; 204/299 EC
[58] Field of Search .................. 204/181, 299 EC

[56] References Cited

U.S. PATENT DOCUMENTS

| | | | |
|---|---|---|---|
| 3,392,101 | 7/1968 | Barrett et al. | 204/181 |
| 3,622,485 | 11/1971 | Preece et al. | 204/181 |
| 3,878,078 | 4/1975 | Tanaka et al. | 204/181 |

FOREIGN PATENT DOCUMENTS

| | | |
|---|---|---|
| 1,243,171 | 8/1971 | United Kingdom |
| 1,131,023 | 10/1968 | United Kingdom |

*Primary Examiner*—Howard S. Williams
*Attorney, Agent, or Firm*—Cushman, Darby & Cushman

[57] ABSTRACT

A method for the electrodeposition coating of an article by use of an alternating current, characterized in that an electrodeposition coating vessel is filled with an aqueous solution or dispersion of an electrodeposition coating composition, which contains as a paint binder (i) a salt of a polycarboxylic acid resin containing 5 wt% or less of low molecular weight acidic impurities, or (ii) a salt of a nitrogen-containing basic resin containing 5 wt% or less of low molecular weight basic impurities, an article to be coated having an electrode area of $S_1$ and an opposite electrode having an electrode area of $S_2$, the electrode area ratio $S_1/S_2$ being 1.5 to 300 are immersed in the above vessel, and an alternating current is impressed between the article to be coated and the opposite electrode, thereby depositing the aforesaid electrodeposition coating composition onto the article to be coated.

40 Claims, 9 Drawing Figures

ELECTRODEPOSITION COATING METHOD USING ALTERNATING CURRENT

This invention relates to a method for depositing a resin film onto an electroconductive material. More particularly, the invention is concerned with an electrodeposition coating method using an alternating current as the electric source for electrodeposition coating.

Electrodeposition coating methods have such advantages that the coating steps can be automated, are hygienic and scarcely bring about evironmental pollution, and hence are utilized in many fields. Among the electrodeposition coating methods proposed hitherto, a method using a direct current as the electric source for electrodeposition coating has exclusively been put into practice. This is because the said method has such merits that since the opposite electrode is not coated at all, the coating operation can be effected in a continuous manner, a coated article having a desired film thickness can be prepared with ease, and a film, which is relatively excellent in smoothness and free from air bubbles, can be easily formed. In order to utilize a direct current as the electric source for electrodeposition coating, however, it is necessary to rectify an alternating current by means of a rectifier. A rectifier is manufactured by use of many diodes or transistors, and hence is extremely high in cost, so that the electrodeposition coating apparatus becomes quite costly. For this reason, the development of an electrodeposition coating method using no such rectifier has been desired from old times.

In view of the above, there have heretofore been investigated various methods utilizing an alternating current as the electric source for electrodeposition coating. One of these is a method proposed in British Pat. No. 1,199,964 or Japanese Patent Kokai (Laid-Open) No. 37437/1973 in which is used as the opposite electrode a rectifying electrode, which is an electrode composed of Al, Ta, Zr, Ti or Nb which has been subjected to electrolytic oxidation treatment. According to the above method, it is possible to directly convert the alternating current to a direct current in an electrodeposition coating bath and form on an article to be coated a film of an electrodeposition coating composition comprising a polycarboxylic acid resin as a paint binder. When the said rectifying electrode is used, however, the current density applicable between two electrodes lowers to a great extent to cause such disadvantage that the thickness of a film capable of being formed on an article to be coated becomes extremely thin, as disclosed also in the aforesaid British patent. That is, when two aluminum electrodes, which had not been subjected to anodic oxidation treatment, were used in experiments under the conditions of an alternating current voltage of 200V and an electrode distance of 3 cm., the current density was 50 mA/cm$^2$, whereas when aluminum electrodes, which had been subjected to anodic oxidation treatment, were used in said experiments, the current density was as greatly small as 0.1 mA/cm$^2$. In order to prevent such a great reduction in current density brought about by use of the rectifying electrodes, the alternating current voltage impressed between the electrodes is required to be made higher. However, if such a high voltage is utilized as the electric source for electrodeposition coating, an undesirable electrolysis reaction of the electrodeposition coating bath takes place and air bubbles are entrained in the film of the resulting coated article, so that it is extremely difficult to obtain a coated article having a beautiful appearance and various excellent film properties, as taught by Japanese Patent Kokai (Laid-Open) No. 37437/1973.

Further, alternating current electrodeposition coating methods using no such rectifying electrodes as mentioned above are disclosed in British Pat. Nos. 1,086,325 and 1,243,171. These methods, however, have such disadvantages that (i) not only the article to be coated but also the opposite electrode is coated simultaneously, so that it is necessary to take such a measure as to always remove the paint deposited onto the opposite electrode, and (ii) when the same alternating current voltage is used, the current density on two electrodes is extremely low, with the result that the thickness of the film formed on the article to be coated becomes markedly thin, like in the above-mentioned alternating current electrodeposition methods using rectifying electrodes. In these methods, therefore, the current density on two electrodes is made more than 6 amps. per sq. ft. so as to form a desirable film on the article to be coated. When electrodeposition coating is effected according to such methods, however, an undesirable electrolysis reaction of the electrodeposition coating bath takes place, or the coating composition, which has deposited on the article to be coated, partly dissolves out when a reverse current is impressed onto the article according to the cycle of the alternating current, and thus it is difficult to obtain a coated article bearing a film excellent in smoothness and uniformity.

With an aim to establish an alternating current electrodeposition coating method that is free from such disadvantages as mentioned above, the present inventors conducted extensive studies to find that the above object can be accomplished by using as the paint binder constituting the electrodeposition coating composition a salt of a polycarboxylic acid resin high in hydrophobic property and low in content of dissociating impurities, or a salt of a nitrogen-containing basic resin high in hydrophobic property and low in content of dissociating impurities, and by using as the two electrodes, to which an alternating current is to be impressed, two electrodes having a specific electrode area ratio.

An object of the present invention is to provide an electrodeposition coating method using an alternating current.

Another object of the invention is to provide an alternating current electrodeposition method using an article to be coated and an opposite electrode which have a specific electrode area ratio.

A further object of the invention is to provide an alternating current electrodeposition method using an electrodeposition coating composition containing a specific resin as the paint binder.

A still further object of the invention is to provide an alternating current electrodeposition method using an electrodeposition coating bath equipped with an overflow tank (each chamber of the bath contains two electrodes having a specific electrode area ratio), and an electrodeposition coating composition containing a specific resin as the paint binder.

Other objects and advantages of the invention will become apparent from the following description.

In accordance with the present invention, there is provided a method for producing a coated article which comprises filling an electrodeposition coating vessel with an aqueous solution or dispersion of an electrodeposition coating composition containing as the paint binder a salt of a purified resin, immersing in the coating bath an article to be coated (A) having an electrode area of $S_1$ and an opposite electrode (B) having an electrode area of $S_2$ in such proportions that the electrode area ratio $S_1/S_2$ becomes 1.5 to 300, connecting the article to be coated (A) and the opposite electrode (B) to an alternating current electric source, and impressing an alternating current to the electrodes to deposit the aforesaid electrodeposition coating composition onto the article to be coated (A). The term "electrode area" used in the specification and claims means the area of the portion of electrode immersed in the aqueous solution or dispersion of the coating composition.

The present invention chiefly includes the following four modes of practice. These modes of practice are explained below with reference to the accompanying drawings, in which FIGS. 1 to 4 and 9 show examples of electrodeposition coating baths preferable for use in the present method;

Figure 1:
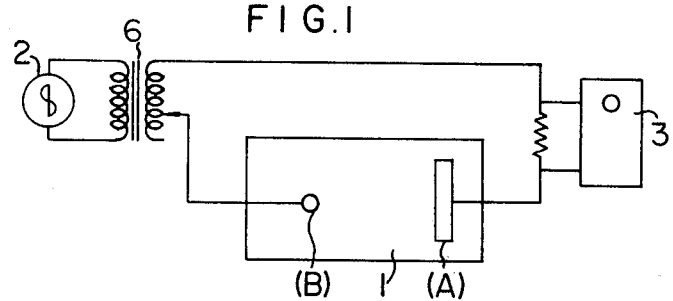

The first mode of practice of the present invention is as follows:

An aqueous dilution of an electrodeposition coating composition containing as the paint binder a salt of a purified resin is placed in an electrodeposition coating vessel 1 assembled in such a manner as shown in FIG. 1. In this vessel, an article to be coated (A) having an electrode area of $S_1$ and an opposite electrode (B) having an electrode area of $S_2$ are immersed in such proportions that the electrode area ratio $S_1/S_2$ becomes 1.5 to 300. Subsequently, the article to be coated (A) and the opposite electrode (B) are connected through a transformer 6 to an alternating current electric source 2, and an alternating current is impressed between the two electrodes.

Figure 2:
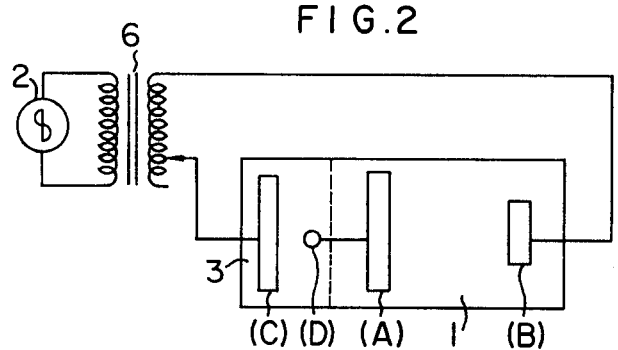

The second mode of practice of the present invention is as follows:

An aqueous solution or dispersion of an electrodeposition coating composition containing as the paint binder a salt of a purified resin is placed in an electrodeposition coating vessel 1 equipped with an overflow tank 3 as shown in FIG. 2. In this vessel, an article to be coated (A) having an electrode area of $S_1$ and an opposite electrode (B) having an electrode area of $S_2$ are immersed in such proportions that the electrode area ratio $S_1/S_2$ becomes 1.5 to 300. In the overflow tank 3, an electrode (C) having an electrode area of $S_3$ and an electrode (D) having an electrode area of $S_4$ are immersed in such proportions that the electrode area ratio $S_3/S_4$ becomes 1.5 to 300. Subsequently, the electrodes (B) and (C) are electrically connected with each other and the electrodes (A) and (D) are connected to an alternating current electric source 2, or the electrodes (A) and (D) are electrically connected with each other and the electrodes (B) and (C) are connected to an alternating current electric source 2, and an alternating current is impressed between said electrodes to deposit the electrodeposition coating composition onto the article to be coated (A), thereby obtaining a coated article.

Figure 3:
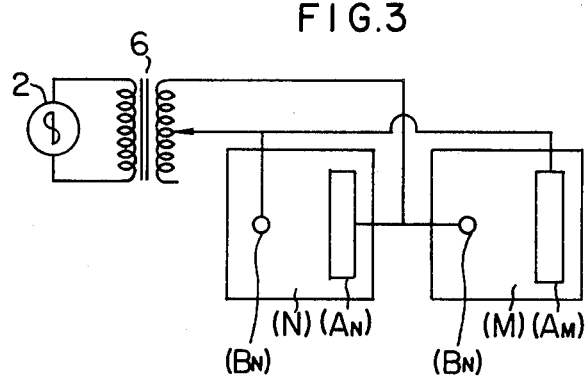

The third mode of practice of the present invention is as follows:

An aqueous dilution of an electrodeposition coating composition containing as the paint binder a salt of a purified resin is placed in two electrodeposition coating vessels (M) and (N) as shown in FIG. 3. In the electrodeposition coating vessel (M), an article to be coated $(A_M)$ having an electrode area of $S_{(M-1)}$ and an opposite electrode $(B_M)$ having an electrode area of $S_{(M-2)}$ are immersed in such proportions that the electrode area ratio $S_{(M-1)}/S_{(M-2)}$ becomes 1.5 to 300. On the other hand, in the electrodeposition coating vessel (N), an article to be coated $(A_N)$ having an electrode area of $S_{(N-1)}$ and an opposite electrode $(B_N)$ having an electrode area of $S_{(N-2)}$ are immersed in such proportions that the electrode area ratio $S_{(N-1)}/S_{(N-2)}$ becomes 1.5 to 300. Subsequently, the electrodes $(A_M)$ and $(B_N)$ and the electrodes $(A_N)$ and $(B_M)$ are individually connected electrically with each other, and the thus connected two electrode units are connected to an alternating current electric source 2. Thereafter, an alternating current is impressed between the electrode units to deposit the electrodeposition coating composition onto the articles to be coated $(A_M)$ and $(A_N)$, thereby obtaining coated articles.

Figure 4:
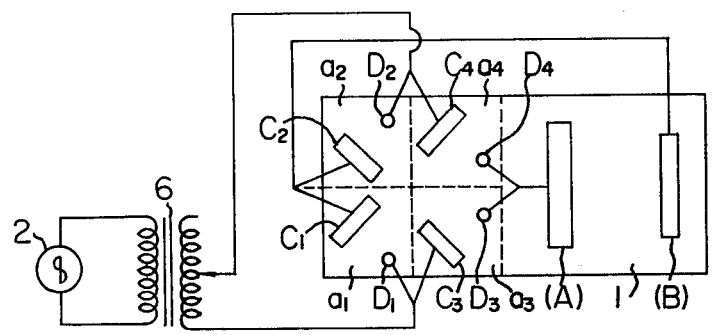

The fourth mode of practice of the present invention is as follows:

An aqueous solution or dispersion of an electrodeposition coating composition containing as the paint binder a salt of a purified resin is placed in an electrodeposition coating vessel 1 equipped with an overflow tank divided into 4 chambers $a_1$, $a_2$, $a_3$ and $a_4$, as shown in FIG. 4. In the electrodeposition coating vessel 1, an article to be coated (A) having an electrode area of $S_1$ and an opposite electrode (B) having an electrode area of $S_2$ are immersed in such proportions that the electrode area ratio $S_1/S_2$ becomes 1.5 to 300. On the other hand, four electrodes $C_1$, $C_2$, $C_3$ and $C_4$ each having an electrode area of $S_3$, and four electrodes $D_1$, $D_2$, $D_3$ and $D_4$ each having an electrode area of $S_4$, are brought into combinations of $C_1$ with $D_1$, $C_2$ with $D_2$, $C_3$ with $D_3$, and $C_4$ with $D_4$ in such proportions that the electrode area ratio $S_3/S_4$ becomes 1.5 to 300, and the thus formed combinations are immersed in the aforesaid chambers $a_1$, $a_2$, $a_3$ and $a_4$, respectively. Subsequently, the electrodes $C_1$ and $C_2$ in the respective chambers $a_1$ and $a_2$ are electrically connected to the opposite electrode (B) in the coating bath, and the electrodes $D_3$ and $D_4$ in the respective chambers $a_3$ and $a_4$ are electrically connected to the article to be coated (A) in the coating bath. Further, the electrodes $D_1$ and $C_3$ in the respective chambers $a_1$ and $a_3$ are electrically connected with each other, while the electrodes $D_2$ and $C_4$ in the respective chambers $a_2$ and $a_4$ are electrically connected with each other, and the thus formed two electrode units are connected to an alternating current electric source, whereby an alternating current is impressed between the two electrode units to deposit the electrodeposition coating composition onto the article to be coated (A), thereby obtaining a coated article.

The salt of purified resin used in practicing the present invention is a salt of an acidic resin including polycarboxylic acid resins, or a salt of a nitrogen-containing basic resin including polyamino resins. Among these resins, those which are preferable for use in the present invention are as mentioned below.

Preferable as the acidic resin is a polycarboxylic acid resin having an acid value of 5 to 50 which has a $pK_a(r)$ value, as defined by the formula (I) shown below, of 8.0 or more, an $n$ value of 0.5 to 1.5 and an $\alpha$ value of 0.3 to 1.5 and which contains 5 wt% or less of low molecular weight acidic impurities having a $pK_1(e)$ value, as defined by the formula (II) shown below, of at least 0.5 smaller than the $pK_a(r)$ value of the main component of the said polycarboxylic acid resin:

$$pH = pK_a(r) + n \log \frac{\alpha}{1-\alpha} \quad \text{(I)}$$

wherein pH is the pH value of an aqueous solution of the salt of the polycarboxylic acid resin; $pK_a(r)$ is the constant $-\log K_a(r)$; $K_a(r)$ is the dissociation constant in water in the polycarboxylic acid resin; $n$ is a parameter showing the degree of spreading of the polycarboxylic acid resin when the resin is dissolved or dispersed in an aqueous medium; and $\alpha$ is the degree of neutralization of the polycarboxylic acid resin with a base, $$pH = pK_a(e) + \log \frac{\alpha}{1-\alpha} \quad \text{(II)}$$

wherein pH is the pH value of an aqueous solution of the acidic impurities; $pK_a(e)$ is the constant $-\log K_a(e)$; $K_a(e)$ is the dissociation constant in water of said impurities; and $\alpha$ is the degree of neutralization thereof with a base.

Preferable as the nitrogen-containing basic resin is a nitrogen-containing basic resin high in hydrophobic property which has a $pK_b(r)$ value, as defined by the formula (III) shown below, of 6.0 or more, an $n'$ value of 0.5 to 1.5 and an $\alpha'$ value of 0.3 to 1.5, and which contains 5 wt% or less of low molecular weight basic impurities having a $pK_b(e)$ value, as defined by the formula (IV) shown below, of at least 0.5 smaller than the $pK_b(r)$ value of the main component of the said nitrogen-containing basic resin:

$$pOH = pK_b(r) + n' \log \frac{\alpha'}{1-\alpha'} \quad \text{(III)}$$

wherein pOH is the pOH value of an aqueous solution of the salt of the nitrogen-containing basic resin; $pK_b(r)$ is the constant $-\log K_b(r)$; $K_b(r)$ is the dissociation constant in water of the nitrogen-containing basic resin; $n'$ is a parameter showing the degree of initial spreading of the nitrogen-containing resin when the resin is dissolved or dispersed in an aqueous medium; and $\alpha'$ is the degree of neutralization of the nitrogen-containing basic resin when the resin is dissolved or dispersed in an aqueous medium; and $\alpha'$ is the degree of neutralization of the nitrogen-containing basic resin with an acid, $$pOH = pK_b(e) + \log \frac{\alpha'}{1-\alpha'} \quad \text{(IV)}$$

wherein pOH is the pOH value of an aqueous solution of the basic impurities; $pK_b(e)$ is the constant $-\log K_b(e)$; $K_b(e)$ is the dissociation constant in an aqueous medium of said impurities; and $\alpha'$ is the degree of neutralization thereof with an acid.

In order to analyze the mechanism of the alternating current electrodeposition coating method of the present invention, procedures adopted in the aforesaid first mode of practice of the present invention are explained below.

Figure 6:
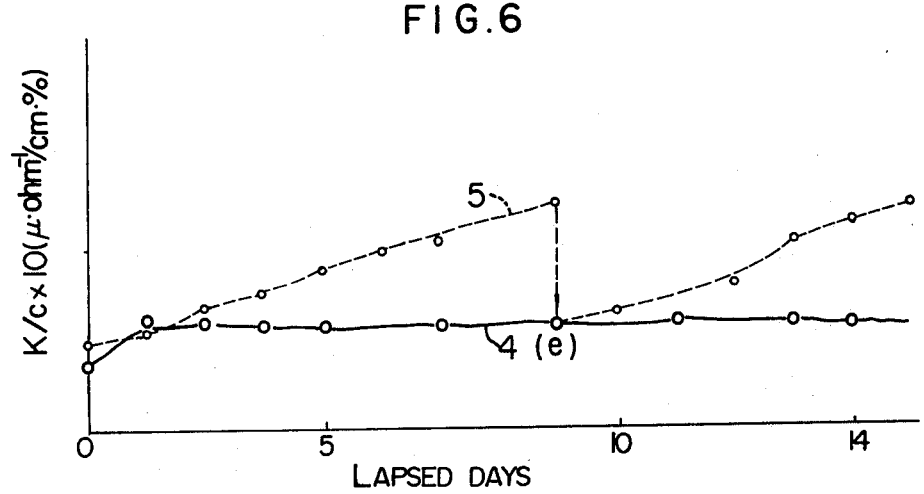
FIG. 6 is a graph showing the relation between lapsed days and specific conductivity when electrodeposition coating was effected according to one of the modes of practice of the present method.
Figure 7:
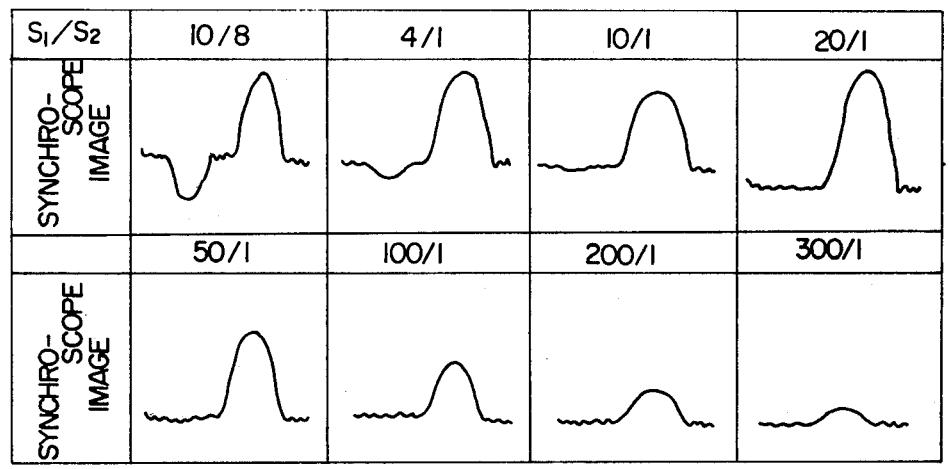
FIGS. 7 and 8 are graphs showing the state of rectification.

An electrodeposition coating composition containing as the paint binder a salt of a purified polycarboxylic acid resin is diluted with water to a solid concentration of 15 wt%, and an electrodeposition coating vessel represented by 1 in FIG. 1 with the resulting aqueous solution or dispersion is filled. In this vessel, two aluminum electrodes are immersed at an electrode distance of 4 cm. with such an electrode area ratio as shown in FIG. 7. Subsequently, the two electrodes are connected to an alternating current electric source 2, and a synchroscope represented by 3 in FIG. 1 is inserted in the thus formed circuit. FIG. 7 shows the wave images which appeared on the synchroscope when an alternating current of 60 Hz and 200 V. was impressed between the two electrodes. Further, the line 4 in FIG. 6 shows the results obtained by measuring the variation in specific conductivity of the electrodeposition coating bath when the bath was run for two weeks. Since the specific conductivity of the bath scarcely increases as seen in FIG. 6, an electrodeposition coating bath at a constant purity level which is extremely high can always be maintained. According to the present invention, therefore, alternating current electrodeposition coating can continuously be performed for a long period of time.

In the above-mentioned method, the rectification phenomenon from alternating current to direct current is considered to be as follows:

When a positive charge is applied to an electrode (A) having a large electrode area and a negative charge to an electrode (B) having a small electrode area, the difference in density of the current flowing between the two electrodes becomes extremely large due to the difference in area between the two electrodes, and an electrodeposition coating composition comprising a polycarboxylic acid resin as the paint binder cataphoretically migrates to the electrode (A) to form a film, while the accumulation of base takes place in the vicinity of the electrode (B) having a small electrode area. When a negative charge is applied to the electrode (A) and a positive charge to the electrode (B) according to the cycle of alternating current, the difference in density of the current flowing between the two electrodes becomes extremely small, entirely contrary to the above-mentioned case, with the result that the electrophoretic migration of base to the vicinity of the electrode (A) and the electrophoretic migration of electrodeposition coating composition to the vicinity of the electrode (B) become extremely little, and, due to the base which has previously been accumulated to a high concentration in the vicinity of the electrode (B), the coating composition becomes markedly high in solubility and is redissolved in the bath without reaching the electrode (B). Thus, it is considered that in the present invention, an alternating current is rectified to a direct current according to such a phenomenon as mentioned above. On the other hand, if a salt of a basic resin is used as the paint binder of the electrodeposition coating composition, the formation of a film due to deposition of the coating composition takes place on the electrode (A), while the accumulation of the acid takes place in the vicinity of the electrode (B), and the same rectification effect as mentioned above can be brought about.

In the above-mentioned method, the electrode area ratio $S_1/S_2$ of the electrode (A) to the electrode (B) was varied, and the wave images which appeared on the synchronscope were shown in FIG. 6. From the results shown in FIG. 6, it is understood that if the electrode area ratio is less than 1.5, the difference in density of current flowing between the two electrodes is difficult to make large, so that even when reverse charges are applied to the two electrodes, a considerably large amount of current flows to cause reverse migration into the bath of the electrodeposition coating composition that has already deposited on the electrode (A), i.e. the article to be coated, and thus it becomes impossible to form a film sufficient in thickness and excellent in surface smoothness. Furthermore, a considerable amount of reverse current flows also to the opposite electrode to cause deposition of the electrodeposition coating composition onto the opposite electrode, so that it becomes impossible to make the opposite electrode act as an opposite electrode. On the other hand, if the aforesaid electrode area ratio is more than 300, the amount of current capable of flowing between the two electrodes becomes too small to allow the electrodeposition coating composition to migrate to the electrode (A), with the result that no film can be formed on the article to be coated. Considering the impression of less reverse current to the opposite electrode, the application to the two electrodes of current sufficient to carry out electrodeposition coating, and the production of a coated article having a film sufficient in thickness and excellent in surface smoothness, it is preferable that the above-mentioned electrode area ratio is made particularly 4 to 100.

If the distance between the electrode (A) and the electrode (B) is excessively short, the density of current flowing through the electrode (A) comes greatly different between the central portion and the peripheral portion of the electrode, with the result that not only the thickness of film formed on the electrode (A), i.e. the article to be coated, becomes heterogeneous but also there are frequently observed the cases where air bubbles are entrained in part of the coated surface. In practicing the present invention, therefore, the distance between the two electrodes is preferably made 4 cm. or more.

The voltage impressed between the two electrodes may be at least 20 V., preferably in the range from 50 to 450 V. Further, the initial current density on the article surface to be impressed between the two electrodes should be made 80 A/m² or less. If this initial current density is greater than 80 A/m², electrolysis reaction of the electrodeposition coating bath or redox reaction at the electrode surface takes place, whereby many air bubbles are entrained in the resulting film and the formation of smooth film is inhibited to make it impossible to form a film having a beautiful appearance and excellent corrosion resistance and chemical resistance. Further, if an initial current density of more than 80 A/m² is adopted as an alternating current electrodeposition coating condition, there is observed such a phenomenon that even when a negative charge is applied to the electrode (A), i.e. the article to be coated, according to the cycle of alternating current, a considerable amount of current flows to the opposite electrode (B), with the result that the electrodeposition coating composition comes to deposit also on the opposite electrode (B) to inhibit the practice of continuous alternating current electrodeposition coating.

As the material of the opposite electrode (B) used in practicing the present invention, there may be employed any material so far as it is electroconductive. However, when a salt of a polycarboxylic acid resin is used as the salt of purified resin constituting the paint binder of the electrodeposition coating composition, it is preferable to use as the opposite electrode an electrode made of a metal selected from Al, Ti, Nb, Ta, W and Zr, an electrode made of an alloy of said metals, or said electrodes which have been subjected to anodic oxidation. The use of the above-mentioned electrode results in such advantages that at the time of alternating current electrodeposition coating, the occurrence of redox reaction on the electrode surface or electrolysis reaction of the electrodeposition coating bath can be made far less than when an electrode made of other electroconductive material is used.

In effecting the alternating current electrodeposition coating under such specific conditions as mentioned above, no sufficient rectification effect can be brought about between the electrode (A) and the opposite electrode (B), unless the resin constituting the paint binder of the electrodeposition coating composition satisfies the specific conditions, with the result that not only can no film having an excellent surface smoothness be formed on the electrode (A) but the electrodeposition coating composition also deposits on the opposite electrode (B) to make it impossible to sufficiently accomplish the objects of the present invention.

As mentioned previously, the paint binder for the electrodeposition coating composition used in practicing the present invention is (i) a salt of a polycarboxylic acid resin having an acid value of 5 to 50 which has a $pK_a(r)$ value, as defined by the aforesaid formula (I), of 8.0 or more, an $n$ value of 0.5 to 1.5 and an $\alpha$ value of 0.3 to 1.5, preferably 0.3 to 0.8 and which contains 5 wt% or less of low molecular weight acidic impurities having a $pK_a(e)$ value, as defined by the aforesaid formula (II), of at least 0.5 smaller than the main component of the polycarboxylic acid resin; or (ii) a salt of a nitrogen-containing basic resin high in hydrophobic property which has a $pK_b(r)$ value, as defined by the aforesaid formula (III) of 6.0 or more, an $n'$ value of 0.5 to 1.5 and an $\alpha'$ value of 0.3 to 1.5 preferably 0.3 to 0.8 and which contains 5 wt% or less of low molecular weight basic impurities having a $pK_b(e)$ value, as defined by the aforesaid formula (IV), of at least 0.5 smaller than the $pK_b(r)$ value of the main component of the nitrogen-containing basic resin.

A salt of a polycarboxylic acid resin or nitrogen-containing basic resin having an acid value of less than 5 is low in solubility and dispersibility in water, and cannot give an electrodeposition coating composition excellent in bath stability. On the other hand, if alternating current electrodeposition coating is carried out by using, in place of the electrodeposition coating composition used in the present invention, an electrodeposition coating composition containing as the paint binder a polycarboxylic acid resin having an acid value of more than 50 and a $pK_a(r)$ value of less than 8.0, or a nitrogen-containing basic resin having a $pK_b(r)$ value of less than 6.0, no film high in hydrophobic property can be formed on the electrode (A), i.e. the article to be coated. Accordingly, when a reverse charge is applied to the electrode (A) according to the cycle of alternating current, not only is the film formed on the electrode (A) redissolved to make it impossible to form on the electrode (A) a film excellent in surface smoothness but the throwing power is also lowered. Further, in such a case, a deposition phenomenon of the electrodeposition coating composition comes to be observed also on the opposite electrode (B).

The $n$ (or $n'$) value is a parameter showing the degree of spreading in water of the polycarboxylic acid resin (or the basic resin). When a salt of the polycarboxylic acid resin (or the basic resin) is dissolved or dispersed in water and the resulting solution or dispersion is allowed to stand, the $n$ (or $n'$) value becomes closer to 1 with the lapse of time. The $n$ (or $n'$) value is a factor for judging the dissolution or dispersion stability in water of the resin. The closer the initial $n$ (or $n'$) value to 1 at the time of dissolving or dispersing the salt of the resin in water, the less the change in dissolution or dispersion stability of the resin and the more stable the aqueous resin solution or dispersion obtained. The $n$ (or $n'$) value is greatly dominated by the composition and distribution of each monomer constituting the resin. In the present invention, the kinds of starting monomers and the manner of polymerization thereof should be so selected that the $n$ (or $n'$) value of the resulting resin is within the range from 0.5 to 1.5.

Further, the $\alpha$ (or $\alpha'$) value of the resin is required to be within the range from 0.3 to 1.5 preferably 0.3 to 0.8. A salt of a resin having an $\alpha$ (or $\alpha'$) value of less than 0.3 is markedly low in water solubility or dispersibility, and hence, cannot form an electrodeposition coating composition excellent in bath stability. On the other hand, a salt of a resin having an $\alpha$ (or $\alpha'$) value of more than 1.5 is high in water solubility. Accordingly, if alternating current electrodeposition coating is carried out by using the salt of said resin in place of the salt of the resin used in the present invention, there are brought about such drawbacks that when a reverse charge is applied to the electrode (A) according to the cycle of alternating current, not only is the electrodeposition paint deposited on the electrode (A) redissolved but particles of the electrodeposition paint coating composition also undesirably deposited on the opposite electrode (B).

The salt of the above-mentioned resin should not contain more than 5 wt% of low molecular weight acidic (or basic) impurities having a $pK_a(e)$ value (or $pK_b(e)$ value) of at least 0.5 smaller than the $pK_a(r)$ value (or $pK_b(r)$ value) of the main component of the resin. These impurities are extremely high in dissociating property in water, so that when alternating current electrodeposition coating is carried out by using, in place of the electrodeposition coating composition used in the present invention, an electrodeposition coating composition comprising as the paint binder a resin containing more than 5 wt% of said impurities, it is impossible to form on the electrode (A), i.e. the article to be coated, an electrodeposited film having a high specific rsistivity value. Further, when a reverse charge is applied to the electrode (A) according to the cycle of alternating current, the film exhibits a redissolution phenomenon to make it impossible to obtain a coated article having a film excellent in properties, and, at the same time, a deposition phenomenon of the electrodeposition coating composition comes to be observed also on the opposite electrode (B). An aqueous coating bath prepared from an electrodeposition coating composition using the said resin as the paint binder tends to be increased in specific conductivity with the lapse of time. This is considered ascribable to that the above-mentioned low molecular weight dissociating impurities contained in the electrodeposition coating composition dissolve out of the electrodeposition coating composition particles into the aqueous phase. If such an aqueous bath, which varies in electric properties with the lapse of time, is used, not only is the continuous production of coated articles definite in qualtiy made impossible, but also the electrodeposition coating composition particles undesirably precipitate to the bath bottom with the lapse of time.

The low molecular weight acidic impurities contained in the aforesaid polycarboxylic acid resin are composed mainly of unpolymerized acidic monomers used as starting materials in the production of the polycarboxylic acid resin or low molecular might polymers of said monomers, and decomposition products of polymerization catalyst, molecular weight regulators, etc. For the removal of these low molecular weight acidic impurities from the polycarboxylic acid resin, the resin or its salt may be treated with an ion-exchange resin, an ion-exchange fiber, a dextran gel or an acrylamide gel having an anion-exchange ability. Particularly, there may be adopted such a procedure that the said resin or its salt is mixed with an anion-exchange resin or fiber, the resulting mixture is stirred at a temperature up to 40° C. for 30 minutes to 6 hours to adsorb the aforesaid impurities on, or to react them with, the said ionexchanger, and then the anion-exchange resin or fiber is removed from the resin according to a filter press filtration method or the like. Further, the thus treated resin or its salt is incorporated, if necessary, with a base, and is mixed and stirred together with a cation-exchange resin or fiber, and then the cation-exchange resin or fiber is removed by filtration, whereby a purified resin salt markedly high in purity can be obtained.

On the other hand, the low molecular weight basic impurities contained in the aforesaid nitrogen-containing basic resin are umpolymerized basic monomers used as starting materials in the production of the basic resin or low molecular weight polymers of said monomers, and decomposition products of polymerization catalyst, etc. For the removal of these impurities from the basic resin, there may be adopted such a procedure that the resin is mixed with a cation-exchanger such as, for example, a cation-exchange resin, a cation-exchange fiber, a dextran gel or an acrylamide gel to adsorb the impurities on, or to react them with, the said cation-exchanger, and then the cation-exchanger is removed by filtration. Particularly when a cation-exchange resin or fiber is used, the impurities can efficiently be removed from the resin. Further, the thus treated resin or its salt is mixed and stirred together with an anion-exchange resin or fiber, and then the anion-exchange resin or fiber is removed by filtration, whereby the resin or salt can be converted into a resin or salt extremely low in content of impurities.

Concrete examples of the polycarboxylic acid resin used in practicing the present invention include polyester resins, polybutadiene type resins and vinyl polymers having a molecular weight preferably in the range from 5,000 to 25,000. The vinyl polymers are polymers obtained from 1 to 15 mole% of at least one member selected from the group consisting of $\alpha,\beta$-monoethylenically unsaturated carboxylic acids such as, for example, acrylic, methacrylic, itaconic and $\alpha$-methylene glutaric acids; and monocarboxylic acids such as, for example, hydroxyethyl (meth)acrylate monophthalates, hydroxyethyl (meth)acrylate monosuccinates, hydroxypropyl (meth)acrylate monophthalates and hydroxypropyl (meth)acrylate monosuccinates which are represented by the formula (V), $$\overset{R}{\underset{|}{CH_2=C}}-COO-R_1-OOCR_2COOH \qquad (V)$$

wherein R is H or $CH_3$; $R_1$ is a $C_2$-$C_8$ alkylene group; and $R_2$ is a $C_2$-$C_6$ alkylene or phenylene group; 5 to 80 mole% of at least one member selected from the group consisting of compounds represented by the formula (VI),

$$CH_2=\overset{R}{\underset{|}{C}}-COOR_3 \qquad (VI)$$

wherein R is as defined above; and $R_3$ is a $C_1$–$C_{18}$ alkyl group, a phenyl group or a benzyl group, such as, for example, methyl (meth)acrylates, ethyl (meth)acrylates, butyl (meth)acrylates, n-propyl (meth)acrylates, isopropyl (meth)acrylates, isobutyl (meth)acrylates, pentyl (meth)acrylates, cyclohexyl (meth)acrylates, octyl (meth)acrylates, 2-ethylhexyl (meth)acrylates, nonyl (meth)acrylates, decyl (meth)acrylates, dodecyl (meth)acrylates, tridecyl (meth)acrylates, stearyl (meth)acrylates, lauryl (meth)acrylates, benzyl (meth)acrylates and phenyl (meth)acrylates; and 5 to 94 mole% of at least one other copolymerizable monomer. Examples of the above-mentioned other copolymerizable monomers include N-alkoxyalkyl (meth)acrylamides such as methoxymethyl (meth)acrylamides, ethoxymethyl (meth)acrylamides, propoxymethyl (meth)acrylamides, butoxymethyl (meth)acrylamides, pentoxymethyl (meth)acrylamides; N-hydroxyalkyl (meth)acrylamides, such as N-2-oxa-4-methylpentyl (meth)acrylamide; hydroxyalkyl (meth)-acrylates such as 2-hydroxyethyl (meth)acrylates, 3-hydroxypropyl (meth)acrylates, 4-hydroxybutyl (meth)acrylates and 6-hydroxyhexyl (meth)acrylates; styrene; α-methylstyrene; acrylonitrile; methacrylonitrile; vinyl acetate; vinyl propionate; (meth)acrylamides and fluoroalkyl (meth)acrylates. Among these monomers, the N-alkoxyalkyl (meth)acrylamides, N-hydroxyalkyl (meth)acrylamides or hydroxyalkyl (meth)acrylates, when copolymerized in a proportion of 5 to 60 mole%, give thermosetting polymers.

As the base for neutralizing the above-mentioned polycarboxylic acid resin, there may be used inorganic bases such as sodium hydroxide and potassium hydroxide; and organic bases such as amonia, amines and hydroxylamines, e.g. methylamine, ethylamine, dimethylamine, diethylamine, methylethylamine, trimethylamine, triethylamine and dimethylamino ethanol.

Concrete examples of the nitrogen-containing basic resin used in practicing the present invention are polymers of basic vinyl monomers which have a molecular weight of 5,000 to 25,000. Examples of the basic vinyl monomers include dimethylaminoethyl (meth)-acrylates, diethylaminoethyl (meth)acrylates, dibutylaminoethyl (meth)acrylates, N-(2-morpholinoethyl) (meth)acrylamides, 2-aminoethyl vinyl ether, 5-aminopentyl vinyl ether, 2-morpholinoethyl vinyl ether, 2-vinylimidazole, N-vinylimidazoline, N-methyl-2,4-dimethylimidazole, 2-vinylpyridine, 3-vinylpyridine, 4-vinylpyridine and 5-vinylpyridine. These monomers are preferably copolymerized in a proportion of 1 to 40 mole%. As other copolymerizable vinyl monomers, there may be used α,β-monoethylenically unsaturated carboxylic acids, (meth)acrylates represented by the formula (VI), N-alkoxyalkyl (meth)acrylamides, hydroxyalkyl (meth)acrylates, styrene, α-methylstyrene, (meth)acrylamides and derivatives thereof which are used for the preparation of the polycarboxylic acid resins.

Concrete examples of the acid for preparing a salt of the above-mentioned basic resin include inorganic acids such as hydrochloric acid, sulfuric acid, phosphoric acid and the like and organic acids such as acetic acid, formic acid, oxalic acid, maleic anhydride, p-toluenesulfonic acid, and the like.

The above-mentioned carboxylic acid resins amd nitrogen-containing basic resins may be used alone as paint binders for the preparation of electrodeposition coating compositions. If necessary, however, they may be used as paint binders in combination with aminoplasts such as alkoxyalkylated melamine resins and alkoxyalkylated benzoguanamine resins, or with polyepoxy compounds having an epoxy value of 100 to 2,000.

In the next place, the second, third and fourth modes of practice of the present invention are explained below.

The second mode of practice shown in FIG. 2 is a method in which the rectification of alternating current ot direct current is substantially carried out in the overflow tank attached to the electrodeposition coating bath. In this method, the same rectification as in the first mode of practice is effected in the overflow tank, and, when the paint binder is a salt of a polycarboxylic acid resin, a positive charge is impressed to the electrode (A), i.e. the article to be coated, while when the paint binder is a salt of a basic resin, a negative charge is impressed thereto, whereby the electrodeposition coating composition deposits onto the electrode (A) to give a coated article. The electrode area ratio $S_3/S_4$ of the electrodes (C) and (D) immersed in the overflow tank should be in the range from 1.5 to 300. If the said electrode area ratio is less than 1.5, the rectification efficiency of alternating current to direct current is low, while if the said ratio is more than 300, the amount of the current capable of being taken out becomes far lower than that of the impressed alternating current, and hence, cannot substantially be utilized as an electric source for electrodeposition coating. In this second mode, it is necessary that the electrodes (B) and (C) are electrically connected with each other and the electrodes (A) and (D) are connected to the alternating current electric source 2, or the electrodes (A) and (D) are electrically connected with each other and the electrodes (B) and (C) are connected to the alternating current electric source 2, thereby impressing the alternating current. In applying this alternating current electrodeposition coating method to the continuous coating of an article, it is preferable to adopt such a wiring procedure that the electrode (A), i.e. the article to be coated, is not directly connected to the alternating current electric source. This is because when such a wiring as shown in FIG. 2 is adopted, no causes for the generation of sparks and the like troubles are brought about at the time of transferring the article to be coated to the bath bar. Since the liquid in the overflow tank is being more vigorously stirred than in the coating bath, the electrodeposition coating composition does not substantially deposit onto the electrode (C) even when such a wiring as shown in FIG. 2 is adopted and an alternating current is impressed between the electrodes (A) and (D). Accordingly, the rectification of alternating current to direct current can sufficiently be effected to enable the electrodeposition coating composition to deposit onto the electrode (A), i.e. the article to be coated. Further, the electrode area ratio $S_1/S_2$ of the electrode (A), i.e. the article to be coated, and the opposite electrode (B) in the coating bath should be in the range from 1.5 to 300, preferably from 4 to 100. If the said electrode area ratio is less than 1.5, the density of current flowing to the electrode (A) at the initial stage of electrodeposition coating becomes extremely high, with the result that the foaming on the electrode surface and the electrolysis reaction of the bath are undesirably brought about. On the other hand, if the said electrode area ratio is more than 300, no sufficient current can flow between the two electrodes to make it impossible to obtain a coated article.

The third mode of practice of the present invention is a method in which two electrodeposition coating vessels are used as shown in FIG. 3. In this method, the electrodes ($A_N$) and ($B_M$), and the electrodes ($A_M$) and ($B_N$), in the coating vessels (M) and (N) are individually connected electrically with each other, and the resulting two electrode units are connected to the alternating current electric source 2. By adoption of such a wiring procedure as above, a charge necessary for electrodeposition coating can be impressed alternately according to the cycle of alternating current to each of the electrodes ($A_N$) and ($A_M$) in the coating vessels (M) and (N). Thus, this method has the advantage that an alternating current can successfully be utilized without any loss. In this method also, the electrode area ratio between the electrode to be coated and the opposite electrode should be maintained in the range from 1.5 to 300, preferably from 4 to 100, for the same reason as mentioned previously.

Figure 8:
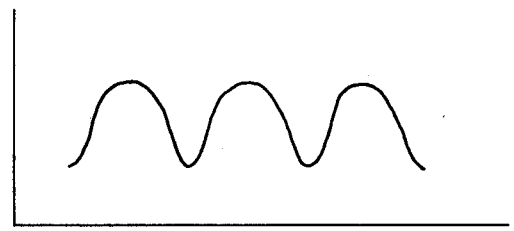

The fourth mode of practice of the present invention is such a method as mentioned below. In this method, there is used an electrodeposition coating vessel equipped with an overflow tank divided into four chambers $a_1$, $a_2$, $a_3$ and $a_4$, as shown in FIG. 4. In the chambers $a_1$, $a_2$, $a_3$ and $a_4$, electrodes $C_1$, $C_2$, $C_3$ and $C_4$ having an electrode area of $S_3$ and opposite electrodes $D_1$, $D_2$, $D_3$ and $D_4$ having an electrode area of $S_4$, which have been brought into combinations of $C_1$ with $D_1$, $C_2$ with $D_2$, $C_3$ with $D_3$, and $C_4$ with $D_4$, are immersed in such proportions that the electrode area ratio $S_3/S_4$ becomes 1.5 to 300. In the coating vessel 1, an electrode (A) having an electrode area of $S_1$ and an electrode (B) having an electrode area of $S_2$ are immersed in such proportions that the electrode area ratio $S_1/S_2$ becomes 1.5 to 300. Subsequently, the combination of the electrodes $C_1$, $C_2$ and (B) and the combination of the electrodes $D_3$, $D_4$ and (A) are individually wired so as to be brought into an electrically connected state. Further, the combination of the electrodes $D_1$ and $C_3$ and the combination of the electrodes $D_2$ and $C_4$ are individually wired so as to be brought into an electrically connected state, and an alternating current is impressed between the two to deposit the electrodeposition coating composition onto the electrode (A), thereby obtaining a coated article. In place of the above-mentioned wiring procedure, there may be adopted other wiring procedures identical in effectiveness therewith. In this method, an electric current flows between the electrodes (A) and (B) only when the potential of the electrode (C) is higher than that of the electrode (D), whereby the electrodeposition coating composition can be deposited on the electrode (A). In the fourth mode of practice, the wiring is made so that the electrodes $C_1$, $C_2$ and (B) are always maintained at the same potential, and electrodes $D_3$, $D_4$ and (A) are maintained at the same potential. When a positive charge is impressed to the electrode $C_4$ and a negative charge is impressed to the electrode $D_1$ in the above case the relation between the potentials of the above electrodes becomes as follows: $C_4 > D_4$, $D_4 = A$, $A > B$, $B = C_1$ and $C_1 > D_1$. Therefore, an electric current flows in the following direction: $C_4 \rightarrow D_4 \rightarrow A \rightarrow B \rightarrow C_1 \rightarrow D_1$. Thus, the electrodeposition coating composition deposites on the electrode (A) which is higher in potential than the electrode (B). On the other hand, when a positive charge is impressed to the electrode $C_3$ and a negative charge is impressed to the electrode $D_2$ according to the cycle of alernating current, the relation between the potentials of the electrodes becomes $C_3 > D_3$, $D_3 = A$, $A > B$, $B = C_2$, $C_2 > D_2$, and an electric current flows in the following direction: $C_3 \rightarrow D_3 \rightarrow A \rightarrow B \rightarrow C_2 \rightarrow D_2$. Therefore, the electrodeposition coating composition also deposites on the electrode (A) which is higher in potential than the electrode (B). According to this method, a positive charge is always impressed to the electrode (A), as shown in FIG. 8. Thus, this method has the advantage that an alternating current can be utilized as an electric source for electrodeposition coating without any loss.

As the material for the opposite electrode in practicing the present invention, there may be utilized any material so far as it is electroconductive. Concrete examples of such electroconductive material include iron, nickel, stainless steel, aluminum, tantalum, niobium, titanium, zirconium, tungsten, and carbon. However, the opposite electrode is desirably an electrode which does not contaminate the electrodeposition coating bath nor color the resulting film. Examples of such electrode are electrodes made of Al, Nb, Ti, Ta, W and Zr, electrodes made of alloys of said metals, and electrodes made of said metals or alloys which have been subjected to anodic oxidation. Among these, the electrodes which have been subjected to anodic oxidation give a marked effect particularly when salts of polycarboxylic acid resins are used as the salts of purified resins.

In practicing the present alternating current electrodeposition coating method, there are some cases wherein the coating composition is deposited on the opposite electrode. In such cases, the opposite electrode may be separated from the coating bath by means of a porous material through which electric current can pass but the coating composition cannot, such as cellophane, a polyvinyl alcohol film, porous porcelain sheet or cup, or the like, thereby preventing the deposition of the coating composition on the opposite electrode.

The article to be coated in practicing the present invention may be made of any material, so far as the surface to be coated of the article is electroconductive. Concrete examples of the article include articles made or iron, copper, aluminum, anodized metals, and electroconductive plastics, and articles which have been subjected to vapor deposition or plating of metals. When the anodized product prior to filling pores is used as the article to be coated, there is attained the advantage that both the filling of pores and the thick coating of the article can be effected simultaneously.

As mentioned above, in the present invention, a partially neutralized salt of the purified carboxylic acid resin or nitrogen-containing basic resin high in hydrophobic property is used as the resin constituting the paint binder of the electrodeposition coating composition and the electrode area ratio between the electrode to be coated and the opposite electrode is maintaned in the range from 1.5 to 300, thereby making extremely high the concentrations of the resin and the neutralizing agent in the vicinity of the respective electrodes in the bath to obtain an effect of rectifying an alternating current to a direct current and to form a film having a high volume resistivity on the article to be coated, so that the method of the present invention is preferable also from the standpoint of throwing power. Furthermore by the establishment of such specific conditions as mentioned above, the present invention gives such a great advantage that the impression of reverse current to the opposite electrode can be inhibited substantially completely, so that the opposite electrode is scarcely contaminated even when the alternating current electrodeposition coating is continuously effected over a long period of time.

The present invention is illustrated in further detail below with reference to examples, which are by way of illustration and not by way of limitation.

EXAMPLE 1

A monomer mixture of the composition shown below was charged into a flask equipped with a stirrer, a reflux condenser and a thermometer, heated to 70° C. over a period of 2.5 hours, and then polymerized at said temperature for 5.5 hours. Thereafter, the contents of the flask were heated to 75° C. and further polymerized at said temperature for 4 hours to prepare a resin solution (A).

|  | Parts by weight |
|---|---|
| Tridecyl methacrylate | 35.9 |
| Styrene | 26.3 |
| 2-Hydroxyethyl methacrylate | 11.6 |
| N-Butoxymethyl acrylamide | 13.3 |
| Itaconic acid | 3.9 |
| 2-Mercaptoethanol | 2.8 |
| Isopropanol | 78.1 |

The acid value of the polycarboxlic acid resin contained in said resin solution (A) was 32.5

To 1,000 parts by weight of this resin solution (A) were added β-dimethylaminoethanol in such an amount as to provide a degree of neutralization α of 0.45, 10 parts by weight of an OH type anion-exchange resin and 50 parts by weight of deionized water, and the resulting mixture was stirred at 40° C. for 3 hours. Thereafter, the mixture was incorporated with 5 parts by weight of a cellulosic filter aid, stirred and then filtered by means of a filter press to prepare a salt of purified carboxylic acid resin. The acid value of the purified polycarboxylic acid resin was 28.4. From this, it was confirmed that the resin solution (A) contained low molecular weight acidic impurities in a proportion of about 5 in terms of acid value. The salt of the purified polycarboxylic acid resin had a $pK_a(r)$ value of 9.10, an n value of 1.16 and an α value of 0.35.

300 parts by weight of the resin solution (A) was sufficiently mixed with 4.35 parts by weight of β-dimethylaminoethanol and 63 parts by weight of an 80% isopropanol solution of a butoxymethylated melamine resin. 120 parts by weight of the resulting resin mixture was mixed with 75 parts by weight of titanium dioxide in a ball mill for 24 hours and was further mixed for 24 hours with 240 parts by weight of the aforesaid resin mixture to obtain a white enamel (B). To 1,000 parts by weight of the above-mentioned white enamel (B) were added 10 parts by weight of an OH type anion-exchanging resin (average particle size 50–150 μ) and 50 parts by weight of deionized water. The resulting mixture was stirred at 40° C. for 3 hours, and then incorporated with 5 parts by weight of a cellulosic filter aid. Subsequently, the mixture was sufficiently stirred, and then filtered by use of a filter press to prepare a white enamel (C) containing the purified resin as a paint binder. This white enamel paste (C) was diluted with deionized water to a solids concentration of 15 wt%. To 300 parts by weight of the resulting aqueous dilution was added 10 parts by weight of an H type cation-exchange resin. The resulting mixture was stirred and then the cation-exchange resin was removed by filtration to obtain an aqueous paint having a pH of 8.3 and a bath specific conductivity of $2.05 \times 10^2 \mu$ ohm$^{-1}$/cm.

With the aqueous paint obtained in the above manner was filled an electrodeposition coating vessel which had been so wired as shown in FIG. 1, and alternating current electrodeposition coating was effected for 2 minutes with impression of a voltage of 300 V., using a zinc phosphate-treated steel plate (0.8 mm × 100 mm × 200 mm) as the electrode (A) to be coated and an aluminum wire of 1 mm. in diameter as the opposite electrode in an electrode distance of 40 mm., while varying the electrode area ratio as shown in FIG. 7. The wave images appeared on a synchroscope during the electrodeposition coating were as shown in FIG. 7. From these wave images, it is clear that alternating current can be rectified to direct current by making the electrode area ratio 1.5 to 300.

Subsequently, the coated plate obtained in the above manner was washed with water and then baked at 180° C. for 30 minutes to form a film on the plate. This film was subjected to measurement of thickness and gloss to obtain the results shown in Table 1.

Table 1

| Electrode area ratio | 4 | 10 | 25 | 50 | 100 | 200 |
|---|---|---|---|---|---|---|
| Gloss (%) | 79 | 82 | 78 | 76 | 72 | 70 |
| Thickness (μ) | 31 | 28 | 24 | 20 | 14 | 12 |

Further, the film was tested for corrosion resistance according to a salt spray method (treated for 300 hours) to find that the width of corrosion at the cut portion of the film was 2 to 4 mm. Thus, it was confirmed that the film was markedly excellent in corrosion resistance.

The above-mentioned alternating current electrodeposition coating was carried out for a period of about 15 days, and the variation in specific conductivity of the electrodeposition coating bath during said period was measured to obtain the results represented by the line 4 in FIG. 6. As is clear from FIG. 6, the degree of said variation is extremely low, and it is understood that according to the present invention, alternating electrodeposition coating can always be effected stably.

Figure 5:
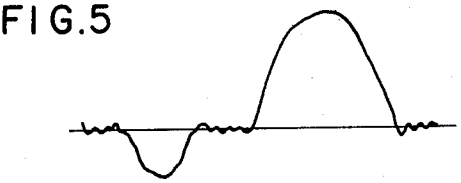

On the other hand, the white enamel (B) was diluted with deionized water to a solids concentration of 15 wt% and then placed in an electrodeposition coating bath which had been so wired as shown in FIG. 1, and alternating current electrodeposition coating was effected by using a zinc phosphate-treated steel plate as the article to be coated and an aluminum wire of 1 mm. in diameter as the opposite electrode in an electrode distance of 80 mm. with electrode area ratios of 10 and 50, and impressing an alternating current voltage of 300 V. for 2 minutes. The coated article thus obtained was washed with water and then baked at 180° C. for 30 minutes, to measure the gloss and thickness of the resulting film, but no film had substantially been formed and it was impossible to measure the said film properties. The wave image appearing on a synchroscope was as shown in FIG. 5, and it was confirmed that according to the above-mentioned coating method, the rectification of alternating current to direct current was considerably difficult. The same alternating current electrodeposition coating as above was carried out for a period of about 15 days, and the variation in specific conductivity of the bath during said period was measured to obtain the results represented by the line 5 in FIG. 6. As is clear from FIG. 6, the bath used in this method becomes far greater in specific conductivity than the bath used in the present invention. When the bath is brought to such a state, the rectification of alternating current to direct current is scarcely possible. Further, as shown by the point (e) in FIG. 6, the bath becomes unusable as an electrodeposition coating bath unless it is purified by treatment with a cation-exchange resin.

EXAMPLE 2

A monomer mixture of the composition shown below was polymerized under the same polymerization conditions as in Example 1 to prepare a resin solution (D).

|  | Parts by weight |
|---|---|
| 2-Ethylhexyl acrylate | 39.9 |
| Styrene | 25.8 |
| N-Butoxymethyl acrylamide | 18.4 |
| Itaconic acid | 4.0 |
| Azobisisobutyronitrile | 2.93 |
| 2-Mercaptoethanol | 1.12 |
| Isopropanol | 62.5 |

Further, a monomer mixture of the composition shown below was poymerized in the same manner as above to prepare a resin solution (E).

|  | Parts by weight |
|---|---|
| Ethyl acrylate | 24.8 |
| Styrene | 22.8 |
| N-Butoxymethyl acrylamide | 19.1 |
| Itaconic acid | 3.23 |
| Azobisisobutyronitrile | 2.93 |
| 2-Mercaptoethanol | 1.12 |
| Isopropanol | 47.4 |

The resin solutions (D) and (E) were individually incorporated in the same manner as in Example 1 with β-dimethylethanol, melamine resin and titanium dioxide to prepare white enamels (F) and (G), respectively. These white enamels were treated in the same manner as in Example 1 with an anion-exchange resin and then with a cation-exchange resin to obtain white enamels (H) and (I).

With each of the thus obtained white enamels (H) and (I) was filled an electrodeposition coating vessel, which had been so wired as shown in FIG. 1, and alternating current electrodeposition coating was effected in the same manner as in Example 1, except that the alternating current voltage was 250 V. and the electrode area ratio was 10. The films formed on the resulting coated materials were subjected to measurement of thickness and gloss to obtain the results shown in Table 2.

Further, each of the white enamels (F) and (G) was diluted with deionized water to a solids concentration of 15 wt%, and then treated in the same manner as above to obtain the results shown in table 2.

Table 2

| Kind of white enamel | Resin | | | Film | |
|---|---|---|---|---|---|
|  | Acid value | $pK_a$ value | n value | Thickness (μ) | Gloss (%) |
| (F) | 34.8 | — | — | Immeasurable | — |
| (G) | 39.0 | — | — | Immeasurable | — |
| (H) | 31.1 | 9.12 | 0.98 | 31 | 80 |
| (I) | 34.7 | 7.8 | 1.20 | Less than 5 μ | — |

From the results shown in Table 2, it is understood that considerable amounts of low molecular weight acidic impurities are contained in the salts of resins constituting the paint binders of the white enamels (F) and (G), and no films sufficient in properties can be formed from such paints by alternating current electrodeposition coating. Further, from the results obtained in the case of the white enamel (I), it is clear that if a polycarboxylic acid resin having a $pK_a(r)$ value of 8.0 or less is used as the paint binder, no excellent film can be formed by alternating current electrodeposition coating.

EXAMPLE 3

A monomer mixture of the composition shown below was polymerized under the same polymerization conditions as in Example 1 to prepare a resin solution, which was then incorporated in the same manner as in Example 1 with β-dimethylaminoethano, melamine resin and titanium dioxide to obtain a white enamel (J).

|  | Parts by weight |
|---|---|
| Ethyl acrylate | 49.3 |
| Styrene | 26.7 |
| N-Butoxymethyl acrylamide | 10.0 |
| Hydroxyethyl methacrylate | 10.0 |
| Itaconic acid | 4.0 |
| Azobisisobutyronitrile | 3.23 |
| 2-Mercaptoethanol | 1.12 |
| Isopropanol | 170.0 |

Further, a monomer mixture of the composition shown below was treated in the same manner as above to obtain a white enamel (K).

|  | Parts by weight |
|---|---|
| Ethyl acrylate | 55.0 |
| Styrene | 31.5 |
| N-Butoxymethyl acrylamide | 10.0 |
| Hydroxyethyl methacrylate | 1.0 |
| Itaconic acid | 2.5 |
| Azobisisobutyronitrile | 3.23 |
| 2-Mercaptoethanol | 1.12 |
| Isopropanol | 170.0 |

To 1,000 parts by weight of each of the thus obtained white enamels (J) and (K) were added 20 parts by weight of an H type cation-exchange fiber having a fiber length of 500 μ. The resulting mixture was stirred at 40° C. for 10 minutes, and then filtered by means of a filter press to prepare white enamels (L) and (M). The acid values, $pK_a(r)$ values and n values of the polycarboxylic acid resins contained in the white enamels (L) and (M) were as shown in Table 3.

The white enamels (J), (K) (L) and (M) were individually diluted with deionized water to a solids concentration of 15 wt%, and then subjected to the same alternating current electrodeposition coating as in Example 2 to form films. The films were measured in thickness and gloss to obtain such results as shown in Table 3.

Table 3

| Kind of white enamel | Resin | | | Film | |
|---|---|---|---|---|---|
|  | Acid value | $pK_a(r)$ value | n value | Thickness (μ) | Gloss (%) |
| (J) | 39.0 | 8.07 | 1.27 | Less than 5 μ | — |
| (L) | 38.0 | 8.10 | 1.26 | 29 | 79 |
| (K) | 21.0 | 8.81 | 1.05 | Less than 5 μ | — |
| (M) | 18.2 | 8.86 | 1.03 | 32 | 81 |

EXAMPLE 4

A monomer mixture of the composition shown below was charged into the same flask as in Example 1, and polymerized at 70° C. for 6 hours and then at 75° C. for 4 hours to prepare a resin solution.

|  | Parts by weight |
|---|---|
| N-Vinylimidazoline | 10 |
| N-2-Oxa-4-methylpenyl acrylamide | 25 |
| Butyl acrylate | 40 |
| Styrene | 25 |
| 2-Mercaptoethanol | 1 |
| Azobisisobutyronitrile | 2 |
| Isopropanol | 100 |

The thus prepared resin solution was incorporated with 6.0 parts by weight of acetic acid. To 300 parts by weight of this resin solution was added 60 parts by weight of an 80% isopropanol solution of a methyletherified melamine resin. 120 parts by weight of the resulting resin mixture was mixed with 75 parts by weight of titanium dioxide in a ball mill for 24 hours, and was further mixed with 240 parts by weight of the aforesaid resin solution in a ball mill for 24 hours to obtain a white enamel (N). To 1,000 parts by weight of this white enamel (N) were added 10 parts by weight of an H type cation-exchange resin having a particle size of 50 to 200 μ and 50 parts by weight of deionized water. The resulting mixture was stirred at 40° C. for 3 hours, and then the cationexchange resin was removed by use of a filter press. The thus treated white enamel was diluted with deionized water to a solids concentration of 15 wt%. To 1,000 parts by weight of the resulting aqueous dilution was added 20 parts by weight of an OH type anion-exchange resin having a particle size of 50 to 150 μ. The resulting mixture was stirred at 40° C. for 3 hours, and then the anion-exchange resin was removed by filtration to prepare an aqueous paint.

With the thus prepared aqueous paint was filled such an electrodeposition coating vessel as shown in FIG. 1, and the paint was then subjected to the same alternating current electrodeposition coating as in Example 1, using an aluminum plate as the electrode (A) to be coated and an aluminum wire of 1 mm. in diameter as the opposite electrode, while varying the electrode area ratio of the two electrodes, to observe the wave images appeared on a synchroscope. As the result, it was confirmed that the wave images were rectified images similar to those shown in FIG. 7.

The coated article, which was obtained by the above-mentioned alternating current electrodeposition coating when the electrode area ratio was 10, was washed with water and then baked at 150° C. for 30 minutes to confirm that a film having a thickness of about 20 μ and excellent in surface smoothness was formed.

EXAMPLE 5

A monomer mixture of the composition shown below was polymerized under the same polymerization conditions as in Example 3 to prepare a resin solution.

|  | Parts by weight |
|---|---|
| N,N-Dimethylaminoethyl methacrylate | 10 |
| N-2-Oxa-4-methylpentyl acrylamide | 25 |
| n-Butyl acrylate | 35 |
| t-Butyl acrylate | 30 |
| Azobisisobutyronitrile | 2 |
| α-Mercaptoethanol | 1 |
| n-Butanol/p-xylene (1/1 by volume mixture) | 100 |

200 Parts by weight of the said resin solution was incorporated with 2 parts by weight of glacial acetic acid to obtain a resin solution (O).

Further, a monomer mixture of the composition shown below was polymerized in the same manner as above to prepare a resin solution.

|  | Parts by weight |
|---|---|
| N,N-Dimethylaminopropyl acrylamide | 10 |
| N-2-Oxa-4-methylpentyl acrylamide | 20 |
| Methyl methacrylate | 20 |
| Hydroxyethyl methacrylate | 10 |
| Butyl acrylate | 40 |
| Azobisisobutyronitrile | 2 |
| α-Mercaptoethanol | 1 |
| Isopropanol | 100 |

100 Parts by weight of the said resin solution was neutralized by addition of 6 parts by weight of acetic acid, and then incorporated with a methylolated melamine resin in a proportion of 20% in terms of resin solid content to obtain a resin solution (P).

The above-mentioned resin solutions (O) and (P) were individually treated in the same manner as in Example 3 with cation- and anion-exchange resins, and then diluted with deionized water to a solids concentration of 15 wt% to prepare resin solutions (R) and (S), respectively. Each of these resin solutions was placed in such an electrodeposition coating vessel as shown in FIG. 1, and then subjected to alternating current electrodeposition coating for 2 minutes with impression of an alternating current voltage of 200 V., using an aluminum plate of 100 cm² in area as the article to be coated and an aluminum wire of 1 mm. in diameter as the opposite electrode at an electrode distance of 40 mm. with an electrode area ratio of 10. Thereafter, the coated article was washed with water and then baked at 170° C. for 20 minutes to confirm that each of the above-mentioned two resin solutions formed a film excellent in surface smoothness and having a thickness of 20 to 21 μ.

EXAMPLE 6

To 300 parts by weight of the resin solution (A) prepared in Example 1 were added 4.35 parts by weight of β-dimethylaminoethanol and 63 parts by weight of the melamine resin solution used in Example 1, and the resulting mixture was sufficiently stirred. To 1,000 parts by weight of the mixture were added 15 parts by weight of an OH type anion-exchange resin having a particle size of 50 to 150 μ and 50 parts by weight of deionized water. The resulting mixture was stirred at 40° C. for 3 hours, incorporated with 5 parts by weight of a cellulosic filter aid, stirred and then filtered by means of a filter press to form a resin solution. This resin solution was diluted with deionized water to a solids concentration of 15 wt%. 500 parts by weight of the resulting aqueous dilution was incorporated with 10 parts by weight of an H type cation-exchange resin and stirred at 35° C. for 3 hours, and then the cation-exchange resin was removed by filtration to obtain a resin solution (Q).

The thus obtained resin solution (Q) was placed in such an electrodeposition coating vessel as shown in FIG. 1, and then subjecting to alternating current electrodeposition coating for 2 minutes with impression of such voltage as shown in Table 4, using an aluminum plate of 1 mm × 70 mm × 150 mm in size as the article to be coated and a 1 mm-diameter opposite electrode made of such a metal as shown in Table 4, in an electrode distance of 40 mm. with an electrode area ratio of 10. Thereafter, the coated article was washed with water and then baked at 180° C. for 30 minutes to form a film. The thickness of the thus formed film was as shown in Table 4.

Table 4

| Kind of opposite electrode | Stainless steel | Copper | Aluminum | | |
|---|---|---|---|---|---|
| Impressed voltage | 50 | 50 | 50 | 100 | 450 |
| Maximum current density (A/m²) | 8.1 | 8.3 | 8.0 | 17.3 | 83.5 |
| Film thickness (μ) | 7.3 | 8.0 | 7.5 | 16.2 | Vigorous foaming |
| State of opposite electrode | Formation of air bubble-containing sludge | Same as left | Un-changed | Un-changed | Un-changed |

The same alternating current electrodeposition coating as above was effected for 2 minutes, except that the impressed voltage was 150 V., a 1 mm-diameter alumite wire havng an oxide film of 4.8 μ in thickness was used as the opposite electrode and the electrode area ratio was as set forth in Table 5. The results obtained were as shown in Table 5.

Table 5

| Electrode area ratio | 1.3 | 5 | 10 | 30 | 50 | 100 |
|---|---|---|---|---|---|---|
| State of opposite electrode | Slight formation of sludge | Un-changed | 10 | 30 | 50 | 100 |
| Film thickness (μ) | 12.5 | 18.2 | 20.1 | 18.6 | 13.5 | 6.2 |

Further, the same alternating current electrodeposition coating as above was effected, except that each of a Ti wire, an anodized Ti wire, a Zr wire, an anodized Zr wire, an Nb wire, an anodized Nb wire, a W wire and a Ta wire was used as the opposite electrode and the electrode area ratio was 10. As a result, a coated article having a film thickness of 18 to 35 μ was obtained, and the alternating current electrodeposition coating could be carried out with extremely high efficiency without causing any change in the vicinity of the opposite electrode.

EXAMPLE 7

To 1,000 parts by weight of the glacial acetic acid-incorporated resin solution (O) prepared in Example 5 were added 20 parts by weight of an H type anionexchange resin and 50 parts by weight of deionized water. The resulting mixture was stirred at 40° C. for 3 hours and then incorporated with 5 parts by weight of a cellulosic filter aid, and the mixture was sufficiently stirred. Subsequently, the anion-exchange resin was removed by filtration using a filter press to obtain a resin solution, which was then diluted with deionized water to a solids concentration of 15 wt%. To 1,000 parts by weight of the resulting aqueous dilution was added 20 parts by weight of an H type cation-exchange resin. The resulting mixture was stirred at room temperature for 3 hours, and then the cation-exchange resin was removed by filtration to prepare a resin solution. This resin solution was placed in such an electrodeposition coating vessel as shown in FIG. 1, and then subjected to the same alternating current electrodeposition coating as in Example 5, except that the aluminum plate used as the article to be coated was replaced by an anodized aluminum plate, a Ti plate, a Ta plate, a Nb plate, or a Zr plate or one of the anodized plates of these metals, whereby a coated article bearing a film excellent in surface smoothness and having a thickness of 20 to 30 μ was obtained.

EXAMPLE 8

In the electrodeposition coating bath prepared in Example 6, alternating current electrodeposition coating was effected for 2 minutes with impression of a voltage of 100 V., using as the article to be coated an alumite plate having an oxide film of 10 μ in thickness, which had not been subjected to filling or pores, and an aluminum wire of 1 mm. in diameter as the opposite electrode in an electrode distance of 40 mm. with an electrode area ratio of 10, whereby a coated article bearing a film having a thickness of 21 μ and excellent in surface smoothness was obtained.

EXAMPLE 9

Alternating current electrodeposition coating of an alumite plate, which had not been subjected to filling of pores, was carried out in the same manner as in Example 8, except that the electrodeposition coating bath was replaced by the bath employed in Example 7, whereby a coated article bearing a film having a thickness of 25 μ and excellent in surface smoothness was obtained.

EXAMPLE 10

The resin solution (Q) prepared in Example 6 was placed in two electrodeposition coating vessels (M) and (N) having such wirings as shown in FIG. 3. Into these vessels, two alumite plates of 1.0 mm × 70 mm × 150 mm in size, which had been subjected to filling of pores, as the electrodes ($A_N$) and ($A_M$) to be coated, and two alumite wires of 1 mm. in diameter as the electrodes ($B_M$) and ($B_N$), were immersed in an electrode distance of 40 mm. with an electrode area ratio of 10. Subsequently, an alternating current of 100 V. was impressed for 2 minutes between the said electrodes to deposit the electrodeposition paint onto the electrodes ($A_M$) and ($A_N$). Thereafter, these electrodes were washed with water and then baked at 180° C. for 30 minutes, whereby a film having a thickness of 13.5 μ and excellent in surface smoothness was formed on the electrode ($A_M$) and a film having a thickness of 13.9 μ and excellent in surface smoothness was formed on the electrode ($A_N$).

EXAMPLE 11

The resin solution (Q) prepared in Example 6 was placed in an electrodeposition coating vessel having such a wiring as shown in FIG. 2, and was recycled according to an overflow method from the coating vessel to the overflow tank attached thereto. In the overflow tank, an aluminum plate of 1.0 mm × 70 mm × 150 mm in size as the electrode (C) and an alumite rod as the opposite electrode (D) were immersed in an electrode distance of 40 mm. with an electrode area ratio of 10. In the coating vessel, two aluminum plates identical in size with the electrode (C) were immersed as the electrodes (A) and (B) at an electrode distance of 80 mm. with an electrode area ratio of 3. Subsequently, an alternating current of 100 V. was impressed for 2 minutes between the electrodes (A) and (D). Thereafter, the electrode (A) was taken out, washed with water and then baked at 180° C. for 30 minutes to obtain a coated article bearing a film having a thickness of 17.2 μ and excellent in surface smoothness.

EXAMPLE 12

The resin solution (Q) prepared in Example 6 was placed in such an electrodeposition coating vessel as shown in FIG. 4, and was recycled from the coating vessel to the overflow tank attached thereto. In the chambers $a_1$, $a_2$, $a_3$ and $a_4$ of the overflow tank, four aluminum plates of 1.0 mm × 70 mm × 150 mm in size as the electrodes $C_1$, $C_2$, $C_3$ and $C_4$ and four aluminum wires of 1 mm. in diameter as the electrodes $D_1$, $D_2$, $D_3$ and $D_4$, which had been brought into such combinations as $C_1$ with $D_1$, $C_2$ with $D_2$, $C_3$ with $D_3$ and $C_4$ and $D_4$, were immersed in an electrode distance of 40 mm. with an electrode area ratio of 10. In the coating vessel, two aluminum plates as the electrodes (A) (1.0 mm × 100 mm × 300 mm) and (B) were immersed at an electrode distance of 80 mm. and an electrode area ratio of 3. The above-mentioned electrodes were so wired as shown in FIG. 4, and an alternating current of 100 V. was impressed thereto for 2 minutes. Thereafter, the electrode (A) was taken out, washed with water and then baked at 180° C. for 30 minutes, whereby a film having a thickness of 15.8 μ and excellent in surface smoothness was formed on the electrode (A).

EXAMPLE 13

Alternating current electrodeposition coating was effected in the same manner as in Example 10, except that the resin solution (Q) was replaced by the resin solution (R) prepared in Example 5, whereby films having thicknesses of 15.1 μ and 15.3 μ and excellent in surface smoothness were formed on the electrodes ($A_N$) and ($A_M$), respectively.

EXAMPLE 14

Alternating current electrodeposition coating was effected in the same manner as in Example 11, except that the resin solution (Q) was replaced by the resin solution (R) prepared in Example 5, whereby a film having a thickness of 18.3 μ and excellent in surface smoothness was formed on the electrode (A).

EXAMPLE 15

Alternating current electrodeposition coating was effected in the same manner as in Example 12, except that the resin solution (Q) was replaced by the resin solution (R) prepared in Example 12, whereby a film having a thickness of 16.0 μ and excellent in surface smoothness was formed on the electrode (A).

EXAMPLE 16

Application example of the second mode:

The white enamel (C) prepared in Example 1 was diluted with deionized water to a solids concentration of about 15 wt%. To 300 parts by weight of the resulting aqueous solution was added 10 parts by weight of an H type cation-exchange resin. The resulting mixture was sufficiently stirred, and then the cation-exchange resin was removed by filtration to prepare an aqueous paint having a pH of 8.3 and a specific conductivity of 2.05 × $10^2$ μ ohm$^{-1}$/cm. This aqueous paint was placed in an electrodeposition coating apparatus having two electrodeposition coating vessels as shown in FIG. 9, and aluminum wires of 1 mm. in diameter were used as the opposite electrodes while aluminum plates of 1.0 mm × 70 mm × 150 mm in size were used as the electrodes ($A_M$) and ($A_N$) to be coated.

Figure 9:
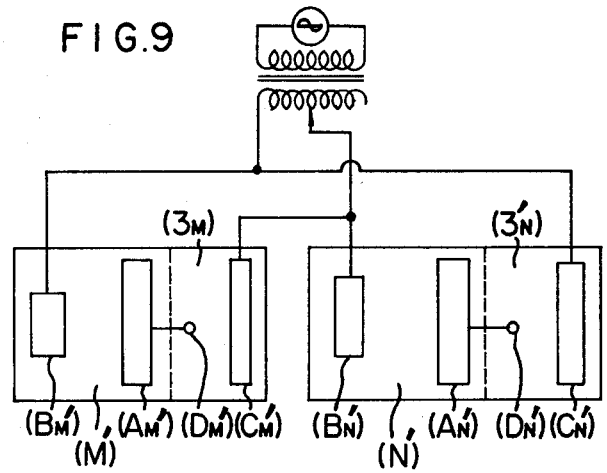

In FIG. 9, (M') and (N') are the electrodeposition coating vessels; (3M') and (3N') are the overflow tanks attached to the respective vessels; ($A_M$) and ($A_N$) are the articles to be coated; ($B_M$) and ($B_N$) are the opposite electrodes in the coating vessels; ($C_M$) and ($C_N$) are large area electrodes in the overflow tanks; and ($D_M$) and ($D_N$) are small area opposite electrodes in the overflow tanks.

In the overflow tanks, the electrodes were immersed with electrode area ratios ($C_M$)/($D_M$) and ($C_N$)/($D_N$) of 10 in electrode distances of 20 mm., while in the coating vessels, the electrodes were immersed with electrode area ratios ($A_M$)/($B_M$) and ($A_N$)/($B_N$) of 3 at electrode distances of 40 mm., and such a voltage as shown in Table 6 was impressed for 2 minutes to deposit the electrodeposition paint onto the electrodes ($A_M$) and ($A_N$) to be coated. Thereafter, the said electrodes were taken out, washed with water and then baked at 180° C. for 30 minutes to form films thereon. The thicknesses and gloss values of the thus formed films were as shown in Table 6.

Table 6

| Impressed voltage | Films | | | |
|---|---|---|---|---|
| | Bath (M') | | Bath (N') | |
| | Thickness (μ) | Gloss (%) | Thickness (μ) | Gloss (%) |
| 100 | 7 | 69 | 7 | 68 |
| 150 | 13 | 75 | 12 | 74 |
| 200 | 22 | 81 | 22 | 83 |
| 250 | 30 | 85 | 31 | 86 |

What is claimed is:

1. A method for producing a coated article which comprises filling an electrodeposition coating vessel with an aqueous solution or dispersion of an electrodeposition coating composition containing as the paint binder the below-mentioned salt of a purified resin, immersing in said vessel an article to be coated (A) having an electrode area of $S_1$ and an opposite electrode (B) having an electrode area of $S_2$ in such proportions that the electrode area ratio $S_1/S_2$ becomes 1.5 to 300, connecting the article to be coated (A) and the opposite electrode (B) to an alternating current electric source, and impressing an alternating current to the electrodes to deposit the aforesaid electrodeposition coating composition onto the article to be coated (A), wherein the salt of purified resin is:

i. a salt of a polycarboxylic acid resin having an acid value of 5 to 50 which has a p$K_a(r)$ value, as defined by the formula (I) shown below, of 8.0 or more, an n value of 0.5 to 1.5 and a degree of neutralization of 0.3 to 1.5, and which contains 5 wt% or less of low molecular weight acidic impurities having a p$K_a(e)$ value, as defined by the formula (II) shown below, of at least 0.5 smaller than the p$K_a(r)$ value of the main component of the resin, $$pH = pK_a(r) + n \log \frac{\alpha}{1 - \alpha} \quad \text{(I)}$$

wherein pH is the pH value of an aqueous solution of the salt of the polycarboxylic acid resin; p$K_a(r)$ is the constant $-\log K_a(r)$; $K_a(r)$ is the dissociation constant in water of the polycarboxylic acid resin; n is a parameter showing the degree of spreading of the polycarboxylic acid resin when the resin is dissolved or dispersed in an aqueous medium; and $\alpha$ is the degree of neutralization of the polycarboxylic acid resin with a base, $$pH = pK_a(e) + \log \frac{\alpha}{1-\alpha} \quad (II)$$

wherein pH is the pH value of an aqueous solution of the acidic impurities; $pK_a(e)$ is the constant $-\log K_a(e)$; $K_a(e)$ is the dissociation constant in water of said impurities; and $\alpha$ is the degree of neutralization of said impurities with a base, or ii. a salt of a nitrogen-containing basic resin high in hydrophobic property which has a $pK_b(r)$ value, as defined by the formula (III) shown below, of 6.0 or more, an n' value of 0.5 to 1.5, and a degree of neutralization $\alpha'$ of 0.3 to 1.5, and which contains 5 wt% or less of low molecular weight basic impurities having a $pK_b(e)$ value, as defined by the formula (IV) shown below, of at least 0.5 smaller than the $pK_b(r)$ value of the main component of the nitrogen-containing basic resin, $$pOH = pK_b(r) + n' \log \frac{\alpha'}{1-\alpha'} \quad (III)$$

wherein pOH is the pOH value of an aqueous solution of the salt of the nitrogen-containing basic resin; $pK_b(r)$ is the constant $-\log K_b(r)$; $K_b(r)$ is the dissociation constant in water of the nitrogen-containing basic resin; n' is a parameter showing the degree of initial spreading of the nitrogen-containing basic resin when the resin is dissolved or dispersed in an aqueous medium; and $\alpha'$ is the degree of neutralization of the nitrogen-containing basic resin with an acid, $$pOH = pK_b(e) + \log \frac{\alpha'}{1-\alpha'} \quad (IV)$$

wherein pOH is the pOH value of an aqueous solution of the basic impurities; $pK_b(e)$ is the constant $-\log K_b(e)$; $K_b(e)$ is the dissociation constant in an aqueous medium of said impurities; and $\alpha'$ is the degree of neutralization of said impurities with an acid.

2. A method according to claim 1, wherein the electrode area ratio $S_1/S_2$ is 4 to 100.

3. A method according to claim 1, wherein the salt of purified resin is a salt of a polycarboxylic acid resin, and the opposite electrode (B) is an unanodized or anodized electrode made of a metal selected from the group consisting of Al, Ti, Zr, Nb, W and Ta, or an unanodized or anodized electrode made of an alloy of said metals.

4. A method according to claim 1, wherein the salt of purified resin is a salt of polycarboxylic acid resin prepared by mixing a polycarboxylic acid resin, or its salt, having an acid value of 5 to 50, which has a $pK_a(r)$ value, as defined by the formula (I) defined in claim 1, of 8.0 or more an n value of 0.5 to 1.5 and an $\alpha$ value of 0.3 to 1.5, with an anion-exchanger to adsorb low molecular weight acidic impurities contained in said polycarboxylic acid resin or its salt onto, or to react them with, said anion-exchanger and then removing the anion-exchanger from the carboxylic acid resin or its salt, or further mixing the said anion-exchanger-treated polycarboxylic acid resin or its salt with a cation-exchanger and then removing the cation-exchanger from the polycarboxylic acid resin or its salt, and converting the polycarboxylic acid resin into a salt if the resin itself is used, thereby reducing to 5 wt% or less the content of low molecular weight acidic impurities having a $pK_a(e)$ value, as defined by the formula (II) defined in claim 1, of at least 0.5 smaller than the $pK_a(r)$ value of the main component of the polycarboxylic acid resin.

5. A method according to claim 1, wherein the salt of purified nitrogen-containing basic resin high in hydrophobic property is a salt of nitrogen-containing basic resin prepared by mixing a nitrogen-containing basic resin, or its salt, high in hydrophobic property, which has a $pK_b(r)$ value, as defined by the formula (III) defined in claim 1, of 6.0 or more, an n' value of 0.5 to 1.5 and an $\alpha'$ value of 0.3 to 1.5, with a cation-exchanger to absorb low molecular weight basic impurities contained in said nitrogen-containing basic resin or its salt onto, or to react them with, said cation-exchanger and then removing the cation-exchanger from the nitrogen-containing basic resin or its salt, or further mixing the said cation-exchanger-treated nitrogen-containing basic resin or its salt with an anion-exchanger and then removing the anion-exchanger from the nitrogen-containing basic resin or its salt, and converting the nitrogen-containing basic resin into a salt if the resin itself is used, thereby reducing to 5 wt% or less the content of low molecular basic impurities having a $pK_b(e)$ value, as defined by the formula (IV) defined in claim 1, of at least 0.5 smaller than the $pK_b(r)$ value of the main component of the nitrogen-containing basic impurities.

6. A method according to claim 1 wherein the current density on the article surface is 80 A/m² or less.

7. A method according to claim 1 wherein the voltage of the alternating current is 20 to 450 V.

8. A method according to claim 1 wherein the article to be coated (A) is an aluminum article or an anodized aluminum article.

9. A method according to claim 1 wherein the salt of purified resin is a salt of polycarboxylic acid resin prepared by mixing a polycarboxylic acid resin, or its salt, having an acid value of 5 to 50, which has a $pKa(r)$ value, as defined by the formula (I) defined in claim 1, of 8.0 or more of n value of 0.5 to 1.5 and an $\alpha$ value of 0.3 to 1.5, with an anion-exchanger to adsorb low molecular weight acidic impurities contained in said polycarboxylic acid resin or its salt onto, or to react them with, said anion-exchanger and then removing the anion-exchanger from the carboxylic acid resin or its salt, or further mixing the said anion-exchanger-treated polycarboxylic acid resin or its salt with a cation-exchanger and then removing the cation-exchanger from the polycarboxylic acid resin or its salt, and converting the polycarboxylic acid resin into a salt if the resin itself is used, thereby reducing to 5 wt% or less the content of low molecular weight acidic impurities having a $pKa(e)$ value, as defined by the formula (II) defined in the main component of the polycarboxylic acid resin.

10. A method according to claim 1 wherein the salt of purified resin is a salt of polycarboxylic acid resin prepared by mixing a polycarboxylic acid resin, or its salt, having an acid value of 5 to 50, which has a $pK_a(r)$ value, as defined by the formula (I)

$$pH = pK_a(r) + n \log \frac{\alpha}{1-\alpha} \quad (I)$$

wherein pH is the pH value of an aqueous solution of the salt of the polycarboxylic acid resin; $pK_a(r)$ is the constant $-\log K_a(r)$; $K_a(r)$ is the dissociation constant in water of the polycarboxylic acid resin; n is a parameter showing the degree of spreading of the polycarboxylic acid resin when the resin is dissolved or dispersed in an aqueous medium; and $\alpha$ is the degree of neutralization of the polycarboxylic acid resin with a base of 8.0 or more than an n value of 0.5 to 1.5 and an $\alpha$ value of 0.3 to 1.5, with an anion-exchanger to adsorb low molecular weight acidic impurities contained in said polycarboxylic acid resin or its salt onto, or to react them with, said anion-exchanger and then removing the anion-exchanger from the carboxylic acid resin or its salt, or further mixing the said anion-exchanger-treated polycarboxylic acid resin or its salt with a cation-exchanger and then removing the cation-exchanger from the polycarboxylic acid resin or its salt, and converting the polycarboxylic acid resin into a salt if the resin itself is used, thereby reducing to 5 wt% or less the content of low molecular weight acidic impurities having a $pK_a(e)$ value, as defined by the formula (II)

$$pH = pK_a(e) + \log \frac{\alpha}{1-\alpha} \quad (II)$$

wherein pH is the pH value of an aqueous solution of the acidic impurities; $pK_a(e)$ is the constant $-\log K_a(e)$; $K_a(e)$ is the dissociation constant in water of said impurities; and $\alpha$ is the degree of neutralization of said impurities with a base of at least 0.5 smaller than the $pK_a(r)$ value of the main component of the polycarboxylic acid resin.

11. A method according to claim 1 wherein the opposite electrode is separated from the coating bath by means of a porous material through which electric current can pass but the coating composition cannot.

12. A method according to claim 1 wherein the salt of the purified resin has a degree of neutralization $\alpha$ or $\alpha'$ of 0.3 to 0.8.

13. A method for producing a coating article which comprises filling an electrodeposition coating vessel equipped with an overflow tank with an electrodeposition coating composition containing as the paint binder the below-mentioned salt of a purified resin, immersing in said coating vessel an article to be coated (A) having an electrode area of $S_1$ and an opposite electrode (B) having an electrode area of $S_2$ in such proportions that the electrode area ratio $S_1/S_2$ becomes 1.5 to 300, immersing in said overflow tank and electrode (C) having an electrode area of $S_3$ and opposite electrode (D) having an electrode area of $S_4$ in such proportions that the electrode area ratio $S_3/S_4$ becomes 1.5 to 300, electrically connecting the opposite electrode (B) with the electrode (C) and connecting the article to be coated (A) and the electrode (D) to an alternating current electric source, or electrically connecting the article to be coated (A) with the electrode (D) and connecting the electrodes (B) and (C) to an alternating current electric source, and impressing an alternating current to the electrodes to deposit the electrodeposition coating composition onto the article to be coated (A), wherein the salt of purified resin is:

i. a salt of a polycarboxylic acid resin having an acid value of 5 to 50 which has a $pK_a(r)$ value, as defined by the formula (I) shown in claim 1, of 8.0 or more, an n value of 0.5 to 1.5 and an $\alpha$ value of 0.3 to 1.5, and which contains 5 wt% or less of low molecular weight acidic impurities having a $pK_a(e)$ value, as defined by the formula (II) shown in claim 1, of at least 0.5 smaller than the $pK_a(r)$ value of the main component of the polycarboxylic acid resin, or ii. a salt of a nitrogen-containing basic resin high in hydrophobic property which has a $pK_b(r)$ value, as defined by the formula (III) shown in claim 1, of 6.0 or more, an n' value of 0.5 to 1.5 and an $\alpha'$ value of 0.3 to 1.5, and which contains 5 wt% or less of low molecular weight basic impurities having a $pK_b(e)$ value, as defined by the formula (IV) shown in claim 1, of at least 0.5 smaller than the $pK_b(r)$ value of the main component of the nitrogen-containing basic resin.

14. A method according to claim 13, wherein the salt of purified resin is a salt of a polycarboxylic acid resin, and the opposite electrode (D) is an unanodized or anodized electrode made of a metal selected from the group consisting of Al, Ti, Zr, Nb, W and Ta, or an unanodized or anodized electrode made of an alloy of said metals.

15. A method according to claim 13 wherein the current density on the article surface is 80 A/m² or less.

16. A method according to claim 13 wherein the voltage of the alternating current is 20 to 450 V.

17. A method according to claim 13 wherein the electrode area ratios $S_{(M-1)}/S_{(M-2)}$ and $S_{(N-1)}/S_{(N-2)}$ are individually 4 to 100.

18. A method according to claim 13 wherein the article to be coated (A) is an aluminum article or an anodized aluminum article.

19. A method according to claim 13 wherein the salt of purified resin is a salt of polycarboxylic acid resin prepared by mixing a polycarboxylic acid resin, or its salt, having an acid value of 5 to 50, which have a pKa (r) value, as defined by the formula (I)

$$pH = pK_a(r) + n \log \frac{\alpha}{1-\alpha} \quad (I)$$

wherein pH is the pH value of an aqueous solution of the salt of the polycarboxylic acid resin; pKa (r) is the constant $-\log K_a(r)$; $K_a(r)$ is the dissociation constant in water of the polycarboxylic acid resin; n is a parameter showing the degree of spreading of the polycarboxylic acid resin when the resin is dissolved or dispersed in an aqueous medium; and $\alpha$ is the degree of neutralization of the polycarboxylic acid resin with a base, of 8.0 or more an n value of 0.5 to 1.5 and an $\alpha$ value of 0.3 to 1.5, with an anion-exchanger to adsorb low molecular weight acidic impurities contained in said polycarboxylic acid resin or its salt onto, or to react them with, said anion-exchanger and then removing the anion-exchanger from the carboxy acid resin or its salt, or further mixing the said anion-exchanger-treated polycarboxylic acid resin or its salt with a cation-exchanger and then removing the cation-exchanger from the polycarboxylic acid resin or its salt, and converting the polycarboxylic acid resin into a salt if the resin itself is used, thereby reducing to 5 wt% or less the content of low molecular weight acidic impurities having a $pK_a(e)$ value, as defined by the formula (II)

$$pH = pK_a(e) + \log \frac{\alpha}{1-\alpha} \quad (II)$$

wherein pH is the pH value of an aqueous solution of the acidic impurities; $pK_a(e)$ is the constant $-\log K_a(e)$;

$K_a(e)$ is the dissociation constant in water of said impurities; and $\alpha$ is the degree of neutralization of said impurities with a base of at least 0.5 smaller than the $pK_a(r)$ value of the main component of the polycarboxylic acid resin.

20. A method according to claim 13 wherein the salt of purified nitrogen-containing basic resin high in hydrophobic property is a salt of nitrogen-containing basic resin prepared by mixing a nitrogen-containing basic resin, or its salt, high in hydrophobic property, which has a $pK_b(r)$ value, as defined by the formula (III)

$$pOH = pK_b(r) + n' \log \frac{\alpha'}{1 - \alpha'} \quad \text{(III)}$$

wherein pOH is the pOH value of an aqueous solution of the salt of the nitrogen-containing basic resin; $pK_b(r)$ is the constant $-\log K_b(r)$; $K_b(r)$ is the dissociation constant in water of the nitrogen-containing basic resin; $n'$ is a parameter showing the degree of initial spreading of the nitrogen-containing basic resin when the resin is dissolved or dispersed in an aqueous medium; and $\alpha'$ is the basic degree of neutralization of the nitrogen-containing basic resin with an acid of 6.0 or more, an $n'$ value of 0.5 to 1.5 and an $\alpha'$ value of 0.3 to 1.5, with a cation-exchanger to absorb low molecular weight basic impurities contained in said nitrogen-containing basic resin or its salt onto, or to react them with, said cation-exchanger and then removing the cation-exchanger from the nitrogen-containing basic resin or its salt, or further mixing the said cation-exchanger-treated nitrogen-containing basic resin or its salt with an anion-exchanger and then removing the anion-exchanger from the nitrogen-containing basic resin or its salt, and converting the nitrogen-containing basic resin into a salt if the resin itself is used, thereby reducing to 5 wt% or less the content of low molecular basic impurities having a $pK_b(e)$ value, as defined by the formula (IV)

$$pOH = pK_b(e) + \log \frac{\alpha'}{1 - \alpha'} \quad \text{(IV)}$$

wherein pOH is the pOH value of an aqueous solution of the basic impurities; $pK_b(e)$ is the constant $-\log K_b(e)$; $K_b(e)$ is the dissociation constant in an aqueous medium of said impurities; and $\alpha'$ is the degree of neutralization of said impurities with an acid of at least 0.5 smaller than the $pK_b(r)$ value of the main component of the nitrogen-containing basic impurities.

21. A method according to claim 13 wherein the opposite electrode is separated from the coating bath by means of a porous material through which electric current can pass but the coating composition cannot.

22. A process for producing a coated article which comprises filling two electrodeposition coating vessels (M) and (N) with an electrodeposition coating composition containing as the paint binder the below-mentioned salt of a purified resin, immersing in the coating vessel (M) an article to be coated $(A_M)$ having an electrode area of $S_{(M-1)}$ and an opposite electrode $(B_M)$ having an electrode area of $S_{(M-2)}$ in such proportions that the electrode area ratio $S_{(M-1)}/S_{(M-2)}$ becomes 1.5 to 300, immersing in the coating vessel (N) an article to be coated $(A_N)$ having an electrode area of $S_{(N-1)}$ and an opposite electrode $(B_N)$ having an electrode area of $S_{(N-2)}$ in such proportions that the electrode area ratio $S_{(N-1)}/S_{(N-2)}$ becomes 1.5 to 300, electrically connecting the article to be coated $(A_M)$ with the opposite electrode $(B_N)$ and the article to be coated $(A_N)$ with the opposite electrode $(B_M)$, connecting the resulting two electrode units to alternating current electric source, and impressing an alternating current to the electrode units to deposit the aforesaid electrodeposition coating composition onto the articles to be coated $(A_M)$ and $(A_N)$, wherein the salt of purified resin is:

i. a salt of a polycarboxylic acid resin having an acid value of 5 to 50 which has a $pK_a(r)$ value, as defined by the formula (I) defined in claim 1, of 8.0 or more, an $n$ value of 0.5 to 1.5 and an $\alpha$ value of 0.3 to 1.5 and which contains 5 wt% or less of low molecular weight acidic impurities having a $pK_a(e)$ value, as defined by the formula (II) defined in claim 1, of at least 0.5 smaller than the $pK_a(r)$ value of the main component of the polycarboxylic acid resin, or ii. a salt of a nitrogen-containing basic resin high in hydrophobic property which has a $pK_b(r)$ value, as defined by the formula (III) defined in claim 1, of 6.0 or more, an $n'$ value of 0.5 to 1.5 and an $\alpha'$ value of 0.3 to 1.5, and which contains 5 wt% or less of low molecular weight basic impurities having a $pK_b(e)$ value, as defined by the formula (IV) defined in claim 1, of at least 0.5 smaller than the $pK_b(r)$ value of the main component of the nitrogen-containing basic resin.

23. A method according to claim 22, wherein the electrode area ratios $S_{(M-1)}/S_{(M-2)}$ and $S_{(N-1)}/S_{(N-2)}$ are individually 4 to 100.

24. A method according to claim 22, wherein the salt of purified resin is a salt of a polycarboxylic acid resin, and the opposite electrodes $(B_M)$ and $(B_N)$ are unanodized or anodized electrodes made of a metal selected from the group consisting of Al, Ti, Zr, Nb, W and Ta, or unanodized or anodized electrodes made of an alloy of said metals.

25. A method according to claim 22, wherein the articles to be coated $(A_M)$ and $(A_N)$ are aluminum articles or anodized aluminum articles.

26. A method according to claim 22, wherein the salt of the purified resin has a degree of neutralization $\alpha$ or $\alpha'$ of 0.3 to 0.8.

27. A method according to claim 22 wherein the current density on the article surface is 80 A/m² or less.

28. A method according to claim 22 wherein the voltage of the alternating current is 20 to 450 V.

29. A method according to claim 22 wherein the salt of a purified resin is a salt of polycarboxylic acid resin prepared by mixing a polycarboxylic acid resin, or its salt, having an acid value of 5 to 50, which has a $pK_a(r)$ value, as defined by the formula (I)

$$pH = pK_a(r) + n \log \frac{\alpha}{1 - \alpha} \quad \text{(I)}$$

wherein pH is the pH value of an aqueous solution of the salt of the polycarboxylic acid resin; $pK_a(r)$ is the constant $-\log K_a(r)$ is the dissociation constant in water of the polycarboxylic acid resin; $n$ is a parameter showing the degree of spreading of the polycarboxylic acid resin when the resin is dissolved or dispersed in an aqueous medium; and $\alpha$ is the degree of neutralization of the polycarboxylic acid resin with a base of 8.0 or more an $n$ value of 0.5 to 1.5 and an $\alpha$ value of 0.3 to 1.5, with an anion-exchanger to adsorb low molecular weight acidic impurities contained in said polycarboxylic acid resin or its salt onto, or to react them with, said anion-exchanger and then removing the anion-exchanger from the carboxylic acid resin or its salt, or further mixing the said anion-exchanger-treated polycarboxylic acid resin or its salt with a cation-exchanger and then removing the cation-exchanger from the polycarboxylic acid resin or its salt, and converting the polycarboxylic acid resin into a salt if the resin itself is used, thereby reducing to 5 wt% or less the content of low molecular weight acidic impurities having a $pK_a(e)$ value, as defined by the formula II $$pH = pK_a(e) + \log \frac{\alpha}{1 - \alpha} \qquad (II)$$

wherein pH is the pH value of an aqueous solution of the acidic impurities; $pK_a(e)$ is the constant $-\log K_a(e)$; $K_a(e)$ is the dissociation constant in water of said impurities; and $\alpha$ is the degree of neutralization of said impurities with a base of at least 0.5 smaller than the $pK_a(r)$ value of the main component of the polycarboxylic acid resin.

30. A method according to claim 22 wherein the salt of purified nitrogen-containing basic resin high in hydrophobic property is a salt of nitrogen-containing basic resin prepared by mixing a nitrogen-containing basic resin, or its salt, hihh in hydrophobic property, which has a $pK_b(r)$ value, as defined by the formula (III)

$$pOH = pK_b(r) + n' \log \frac{\alpha'}{1 - \alpha'} \qquad (III)$$

wherein pOH is the pOH value of an aqueous solution of the salt of the nitrogen-containing basic resin; $pK_b(r)$ is the constant $-\log K_b(r)$; $K_b(r)$ is the dissociation constant in water of the nitrogen-containing basic resin; $n'$ is a parameter showing the degree of initial spreading of the nitrogen-containing basic resin when the resin is dissolved or dispersed in an aqueous medium; and $\alpha'$ is the degree of neutralization of the nitrogen-containing basic resin with an acid of 6.0 or more, an $n'$ value of 0.5 to 1.5 and an $\alpha'$ value of 0.3 to 1.5, with a cation-exchanger to absorb low molecular weight basic impurities contained in said nitrogen-containing basic resin or its salt onto, or to react them with, said cation-exchanger and then removing the cation-exchanger from the nitrogen-containing basic resin or its salt, or further mixing the said cation-exchanger-treated nitrogen-contwining basic resin or its salt with an anion-exchanger and then removing the anion-exchanger from the nitrogen-containing basic resin or its salt, and converting the nitrogen-containing basic resin into a salt if the resin itself is used thereby reducing to 5 wt% or less the content of low molecular basic impurities having a $pK_b(e)$ value, as defined by the formula (IV)

$$pOH = pK_b(e) + \log \frac{\alpha'}{1 - \alpha'} \qquad (IV)$$

wherein pOH is the pOH value of an aqueous solution of the basic impurities; $pK_b(e)$ is the constant $-\log K_b(e)$; $K_b(e)$ is the dissociation constant in an aqueous medium of said impurities; and $\alpha'$ is the degree of neutralization of said impurities with an acid of at least 0.5 smaller than the $pK_b(r)$ value of the main component of the nitrogen-containing basic impurities.

31. A method according to claim 22 wherein the opposite electrode is separated from the coating bath by means of a porous material through which electric current can pass but the coating composition cannot.

32. A method for producing a coated article which comprises filling an electrodeposition coating vessel equipped with an overflow tank divided into four chambers $a_1$, $a_2$, $a_3$ and $a_4$ with an aqueous dilution of an electrodeposition coating composition containing as the paint binder the below-mentioned salt of a purified resin, immersing in the coating vessel an article to be coated (A) having an electrode area of $S_1$ and an opposite electrode (B) having an electrode area of $S_2$ in such proportions that the electrode area ratio $S_1/S_2$ becomes 1.5 to 300, bringing four electrodes $C_1$, $C_2$, $C_3$ and $C_4$ having an electrode area of $S_3$ and four opposite electrodes $D_1$, $D_2$, $D_3$ and $D_4$ having an electrode area of $S_4$ into such combinations as $C_1$ with $D_1$, $C_2$ with $D_2$, $C_3$ with $D_3$ and $C_4$ with $D_4$ in such proportions that the electrode area ratio $S_3/S_4$ becomes 1.5 to 300, immersing the said combinations in the aforesaid chambers $a_1$, $a_2$, $a_3$ and $a_4$, respectively, electrically connecting the electrodes $C_1$ and $C_2$ in the chambers $a_1$ and $a_2$ with the opposite electrode (B) in the coating vessel, electrically connecting the electrodes $D_3$ and $D_4$ in the chambers $a_3$ and $a_4$ with the material to be coated (A) in the coating vessel, further connecting the electrodes $D_1$ and $C_3$ in the chambers $a_1$ and $a_3$ with each othr and the electrodes $D_2$ and $C_4$ in the chambers $a_2$ and $a_4$, and impressing an alternating current between the resulting two electrode units to deposit the electrodeposition coating composition onto the article to be coated (A), wherein the salt of purified resin is:

i. a salt of a polycarboxylic acid resin having an acid value of 5 to 50 which has a $pK_a(r)$ value, as defined by the formula (I) defined in claim 1, of 8.0 or more, an $n$ value of 0.5 to 1.5 and an $\alpha$ value of 0.3 to 1.5, and which contains 5 wt% or less of low molecular weight acidic impurities having a $pK_a(e)$ value, as defined by the formula (II) defined in claim 1, of at least 0.5 smaller than the $pK_a(r)$ value of the main component of the polycarboxylic acid resin, or ii. a salt of a nitrogen-containing basic resin high in hydrophobic property which has a $pK_b(r)$ value, as defined by the formula (III) defined in claim 1, of 6.0 or more, an $n'$ value of 0.5 to 1.5 and an $\alpha'$ value of 0.3 to 1.5, and which contains 5 wt% or less of low molecular weight basic impurities having a $pK_b(e)$ value, as defined by the formula (IV) defined in claim 1, of at least 0.5 smaller than the $pK_b(r)$ value of the main component of the nitrogen-containing basic resin.

33. A method according to claim 32, wherein the electrode area ratios $S_1/S_2$ and $S_3/S_4$ are individually 4 to 100.

34. A method according to claim 33, wherein the current density on the article surface is 80 A/m² or less.

35. A method according to claim 32, wherein the current density of the article surface is 80 A/m² or less.

36. A method according to claim 32, wherein the voltage of the alternating current is 20 to 450 V.

37. A method according to claim 4, wherein the salt of purified resin is a salt of a polycarboxylic acid resin, and the opposite electrodes $D_1$, $D_2$, $D_3$ and $D_4$ are unanodized or anodized electrodes made of a metal selected from the group consisting of Al, Ti, Zr, Nb, W and Ta, or unanodized or anodized electrodes made of an alloy of said metals.

38. A method according to claim 32, wherein the article to be coated (A) is an aluminum article on an anodized aluminum article.

39. A method according to claim 32, wherein the opposite electrode is separated from the coating bath by means of a porous material through which electric current can pass but the coating composition cannot.

40. A method according to claim 32, wherein the salt of purified nitrogen-containing basic resin high in hydrophobic property is a salt of nitrogen-containing basic resin prepared by mixing a nitrogen-containing basic resin, or its salt, high in hydrophobic property, which has a $pK_b(r)$ value, as defined by the formula (III) of 6.0 or more, an $n'$ value of 0.5 to 1.5, and an $\alpha'$ value of 0.3 to 1.5, with a cation-exchanger to absorb low molecular weight basic impurities contained in said nitrogen-containing basic resin or its salt onto, or to react them with, said cation-exchanger and then removing the cation-exchanger from the nitrogen-containing basic resin or its salt, or further mixing the said cation-exchanger-treated nitrogen-containing basic resin or its salt with an anion-exchanger and then removing the anion-exchanger from the nitrogen-containing basic resin or its salt, and converting the nitrogen-containing basic resin into a salt if the resin itself is used, thereby reducing to 5 wt% or less the content of low molecular basic impurities having a $pK_b(e)$ value, as defined by the formula (IV)

$$pOH = pK_b(e) + \log \frac{\alpha'}{1 - \alpha'} \qquad \text{(IV)}$$

wherein pOH is the pOH value of an aqueous solution of the basic impurities; $pK_b(e)$ is the constant $-\log K_b(e)$; $K_b(e)$ is the dissociation constant in an aqueous medium of said impurities; and $\alpha'$ is the degree of neutralization of said impurities with an acid of at least 0.5 smaller than the $pK_b(r)$ value of the main component of the nitrogen-containing basic impurities.

* * * * *

UNITED STATES PATENT OFFICE
CERTIFICATE OF CORRECTION

Patent No. 4,051,004      Dated Sept. 27, 1977

Inventor(s) Takashi SUNAMORI and Sachio OBANA

It is certified that error appears in the above-identified patent and that said Letters Patent are hereby corrected as shown below:

Please add the following priority data:

[30]    Nov. 12, 1974      Japan ............ 49-129593

*Signed and Sealed this*

*Seventeenth* Day of *January 1978*

[SEAL]

*Attest:*

RUTH C. MASON      LUTRELLE F. PARKER
*Attesting Officer*      *Acting Commissioner of Patents and Trademarks*